US008297494B1

(12) United States Patent
Davis et al.

(10) Patent No.: US 8,297,494 B1

(45) Date of Patent: Oct. 30, 2012

(54) ALARM AND INDICATING SYSTEM FOR PREVENTING BURGLARY AND THEFT

(75) Inventors: Steven R. Davis, North Lawrence, OH (US); Virgil Barnes, Carrollton, OH (US); Robert V. Artino, North Canton, OH (US); Gary Baker, Bolivar, OH (US); Neil Gromley, Kensington, OH (US)

(73) Assignee: Diebold, Incorporated, North Canton, OH (US)

( * ) Notice: Subject to any disclaimer, the term of this patent is extended or adjusted under 35 U.S.C. 154(b) by 512 days.

(21) Appl. No.: 12/583,333

(22) Filed: Aug. 17, 2009

Related U.S. Application Data

(60) Provisional application No. 61/189,506, filed on Aug. 20, 2008, provisional application No. 61/217,213, filed on May 27, 2009.

(51) Int. Cl.
*B65G 11/04* (2006.01)

(52) U.S. Cl. ................ 232/44; 232/34; 232/35; 232/36; 232/47; 340/568.1; 340/545.6; 200/61.59; 200/61.62; 109/38; 109/43; 109/66

(58) Field of Classification Search .................... 232/44, 232/45, 17, 19, 34–37, 47–52, 30–32, 43.1, 232/43.2; 340/569, 568.1, 545.6; 200/61.63, 200/61.59, 61.62; 109/38, 43, 66, 67
See application file for complete search history.

(56) References Cited

U.S. PATENT DOCUMENTS

| | | | | |
|---|---|---|---|---|
| 5,818,336 | A * | 10/1998 | Varga et al. | 340/545.1 |
| 5,938,113 | A * | 8/1999 | Kim | 232/47 |
| 6,028,517 | A * | 2/2000 | Sansone et al. | 340/569 |
| 6,375,071 | B1 * | 4/2002 | Kim | 232/47 |
| 6,987,452 | B2 * | 1/2006 | Yang | 340/569 |
| 7,040,529 | B2 * | 5/2006 | Swider et al. | 232/45 |
| 7,114,645 | B2 * | 10/2006 | Felice et al. | 232/31 |
| 7,159,762 | B2 * | 1/2007 | Felice et al. | 232/45 |
| 7,222,779 | B1 * | 5/2007 | Pineda-Sanchez et al. | 232/36 |

* cited by examiner

*Primary Examiner* — William L. Miller
(74) *Attorney, Agent, or Firm* — Ralph E. Jocke; Daniel D. Wasil; Walker & Jocke

(57) ABSTRACT

Apparatus that includes alarms with indicators to prevent burglary and theft includes a depository (10) operative to receive deposit containers (20) from authorized persons who open a lock (24). The apparatus includes a depository head (12) and a chest (14). A security curtain assembly (36) comprising a plurality of movable plate members is operative to selectively block an opening in the top of the chest that communicates with the head in response to an actuator. The actuator operates responsive to at least one circuit to cause the security curtain to close responsive to sensing conditions that may correspond to an attack through one or more sensors. Alarms are given locally or remotely when the at least one circuit senses conditions that may correspond to an attack.

32 Claims, 19 Drawing Sheets

ALARM AND INDICATING SYSTEM FOR PREVENTING BURGLARY AND THEFT

CROSS REFERENCE TO RELATED APPLICATIONS

This application claims benefit pursuant to 35 U.S.C. §119 (e) of Provisional Application Nos. 61/189,506 filed Aug. 20, 2008 and 61/217,213 filed May 27, 2009 the disclosures of each of which are incorporated herein by reference.

TECHNICAL FIELD

This invention relates to signals and indicators associated with alarm and locking devices which may be classified in U.S. Class 116, Subclass 2.

BACKGROUND ART

Alarms with indicator devices are used in conjunction with locking mechanisms to protect items against burglary and theft. One such type of device is used in connection with a depository that can be operated by authorized users to make deposits when a bank is not open. Often such devices are used by merchants who place deposit containers that house financial instrument sheets into the depository. The container may hold the day's receipts for a merchant, such as cash, coin, checks, credit card statements and the like that the merchant wishes to deposit in its bank account. The depository holds the deposit container in a secure manner against burglary until it is opened by authorized personnel who then process the deposit and credit the merchant's account, for example. Attempted unauthorized access causes an alarm and an indication of attempted compromise.

Such alarm and indicator devices including depositories may benefit from improvements.

OBJECTS OF EXEMPLARY EMBODIMENTS

It is an object of an exemplary embodiment to provide an improved device with alarms and indicators.

It is an object of an exemplary embodiment to provide a device with alarms and indicators that can be operated in an unattended manner by a bank or other institution to receive deposits.

It is a further object of an exemplary embodiment to provide a device with alarms and indicators that can accept deposits, and that is more resistant to burglary and theft.

It is a further object of an exemplary embodiment to provide methods for improving the security of devices which include alarms and indicators.

It is a further object of exemplary embodiments to provide methods for upgrading existing devices with alarms and indicators to achieve enhanced security.

Further objects of exemplary embodiments will be made apparent in the following Detailed Description of Exemplary Embodiments and the appended claims.

The foregoing objects are accomplished in an exemplary embodiment through a system which includes alarms with indicators associated with a device which operates to receive deposits. The depository may receive deposit containers that hold financial instrument sheets from bank customers such as merchants.

The exemplary embodiments include a depository structure which has a depository head which is configured to accept deposit containers therein. The depository head is positioned above a secure chest. In the exemplary embodiment the head has a head opening which is configured to receive deposit containers. Access to the depository head is controlled by a movable head door. The head door may be fixed in a closed position except when it is opened by authorized users by actuating a lock. Of course this approach is exemplary.

In an exemplary embodiment an authorized user is enabled to place a deposit container within the depository head when the head door is open. Access through the head to the interior area of the chest is prevented by one or more movable members that are in a blocking position between the head opening and the chest when the head door is open. When the head door is in a closed position, the at least one movable member in the head is operative to allow the depository container placed in the head to move to an opening in the top wall of the secure chest. The deposit container then moves into an interior area of the secure chest. The interior area of the exemplary secure chest holds a plurality of deposit holding containers.

Authorized personnel from the bank or other institution can open a chest door by unlocking a lock thereon. Authorized personnel are enabled to open the chest door and remove the deposit containers from the interior area of the chest through a deposit container removal opening. The deposits can then be processed, analyzed and amounts credited to the depositor's account.

In exemplary embodiments at least one movable plate member is positioned within the secure chest and below the opening through the top wall of the chest through which deposit containers pass. The at least one movable plate member is movable in response to an actuator. Upon triggering the actuator the at least one movable plate member moves to block the opening through the top wall of the chest. In addition when the at least one movable plate member moves from the plate open position to the shut position, the at least one plate member engages the catch which operates to hold the plate member in the shut position.

In an exemplary embodiment the catch is in operative connection with a release. The release must be actuated in order to move the at least one plate member back to the plate open position. In the exemplary embodiment the release is only accessible from inside the interior area of the chest. Thus in an exemplary embodiment once the at least one movable plate member has moved to shut the chest wall opening, only authorized users who can gain access to the interior area of the chest may move the at least one plate member back to the open position. Of course this approach is exemplary.

In exemplary embodiments the actuator which causes the at least one movable plate member to block the chest wall opening may be operated in response to a mechanical triggering mechanism, an electrical triggering mechanism, or both. In one exemplary embodiment a vibration sensor is attached to the depository head. The exemplary vibration sensor is operative to detect oscillating vibrations associated with sawing and/or cutting action. The exemplary vibration sensor is operative to detect the vibrations caused by the operation of burglar tools on components of the depository head. The vibration sensor is operatively connected to at least one circuit. The at least one circuit of the exemplary embodiment is operative to process the signals from the vibration sensor and to cause the actuator to operate in response to sensing vibrations that correspond to sawing action or other similar illicit activity. The at least one circuit is also operative to provide at least one local and/or remote alarm. Further in the exemplary embodiment the at least one circuit is operative to not cause the actuator to operate in response to vibrations sensed as a result of deposit containers being accepted and the depository head operating.

In some embodiments the at least one circuit may include at least one processor and at least one data store. The at least one circuit may also include the capabilities for analyzing one or both of the frequency and amplitude of the vibrations sensed by the vibration sensor. The circuitry may be selectively operative to cause the actuator to operate and cause the movable at least one plate member to shut the opening in the chest wall and give alarms responsive to selected vibratory frequency and/or amplitude parameters. Further in some embodiments the at least one circuit may include adjustments so as to enable setting the sensitivity and frequency of the vibrations necessary to cause operation of the actuator.

In some embodiments the depository may include at least one chest wall opening sensor which operates to detect an object in the chest wall opening. For purposes of this disclosure items immediately adjacent to as well as extending in or through the opening, shall be considered to be in the opening. In various embodiments the at least one chest wall sensor may be positioned above or below the security curtain. In such embodiments at least one head door sensor is operative to sense the position of the depository head door. The chest wall opening sensors and head door sensors are in operative connection with the at least one circuit. The circuit operates to determine if an object is detected in the chest wall opening at a time other than when the head door is in the closed position, as would normally occur when deposit items pass from the depository head into the interior area of the chest. The detection of the head door being open and an item extending in the chest wall opening is indicative of a possible attack, and the at least one circuit is operative to cause the at least one plate member to move to shut the chest wall opening and to cause at least one local and/or remote alarm.

Alternatively or in addition, exemplary embodiments may include a sensor in association with the lock on the depository head that is actuated to enable opening and closing the depository head door. The head lock sensor is in operative connection with the at least one circuit. If the circuit receives an indication that the head door is open while the head lock sensor indicates that the lock is not properly opened, the at least one circuit operates to cause the at least one plate member to move to shut the opening in the chest wall and to cause at least one local and/or remote alarm.

Still other exemplary embodiments may include other sensors for purposes of detecting a condition which causes the closing of the chest wall opening. These include, for example, a head position sensor which operates to sense at least one component of the depository head in its proper position. Thus for example if the depository head is attacked, the movement of the depository head from its operative position is detected by the at least one circuit. In still other embodiments one or more conductors may extend through at least a portion of the depository head. Such conductors may be conductors of electricity, radiation such as visible or nonvisible light, or other suitable signals. The conductors are in operative connection with the at least one circuit that detects that a conductor has been severed such as might occur during an attack. In response to detecting the breaking or severing of a conductor, the at least one plate member moves to shut the chest door opening. Further in some embodiments the conductors may extend on or within a shaft so that when the shaft is cut during an attack, such activity is detected. In each case the at least one circuit is operative to also cause a local and/or remote alarm.

Further in still other exemplary embodiments the at least one circuit may include a timer. In such embodiments if the head door sensor senses that the head door is open beyond a time limit, the at least one circuit operates to cause the plate member to move to shut the opening and may also cause a local or remote alarm. Of course these approaches are exemplary. Further in such embodiments the at least one circuit may operate to determine the existence of and take other steps in response to sensing signals that correspond to a suspect attack condition.

Further in some exemplary embodiments the at least one circuit may be in operative connection with a chest door switch. The chest door switch is operative to indicate if the chest door of the secure chest portion is open. In situations where the door is open the circuitry of the exemplary embodiment is operative to prevent the actuator from operating.

In still other exemplary embodiments the at least one circuit may be in operative connection with an annunciator. The annunciator is operative to provide an audible local alarm signal upon the movable plate member moving to block the opening.

In still other embodiments the at least one circuit in response to sensing vibration corresponding to illicit activity, is operative to generate at least one signal to an alarm system. The at least one signal operates to trigger the alarm system and to indicate an alarm. The alarm system may operate to provide local alarms such as sirens and may also provide remote notification to a remote monitoring center, police authorities or other persons to be notified. Of course these approaches are exemplary.

In still other embodiments the at least one movable plate member and associated actuator may be operated in response to a mechanical trigger. This may include for example causing the actuator to operate in response to a connecting member indicating unauthorized movement of the depository head. The connecting member in some embodiments may be one or more cables that are attached to the depository head. Movement of the depository head or a portion thereof in a manner that corresponds to movement during an attack, moves at least one cable and causes the actuator to release the at least one movable plate member to block the opening to the chest. Further in some embodiments the actuator may operate to cause a local or remote alarm to be given responsive to the closing or releasing of the plate member.

In some exemplary embodiments the at least one connecting member may include a releasible connector that is accessible only from an area within the building in which the depository is located and/or within the interior area of the chest. The at least one releasible connector of the exemplary embodiment is operative to enable a servicer to readily disconnect the at least one connecting member so as to allow service activities related to the depository head. Then when the service activities are completed, the at least one connecting member may be readily reconnected so as to cause the actuator to operate in response to unauthorized movement of portions of the depository head.

It should be understood that these approaches are exemplary and in other embodiments other approaches may be used.

DETAILED DESCRIPTION OF EXEMPLARY EMBODIMENTS

Figure 1:
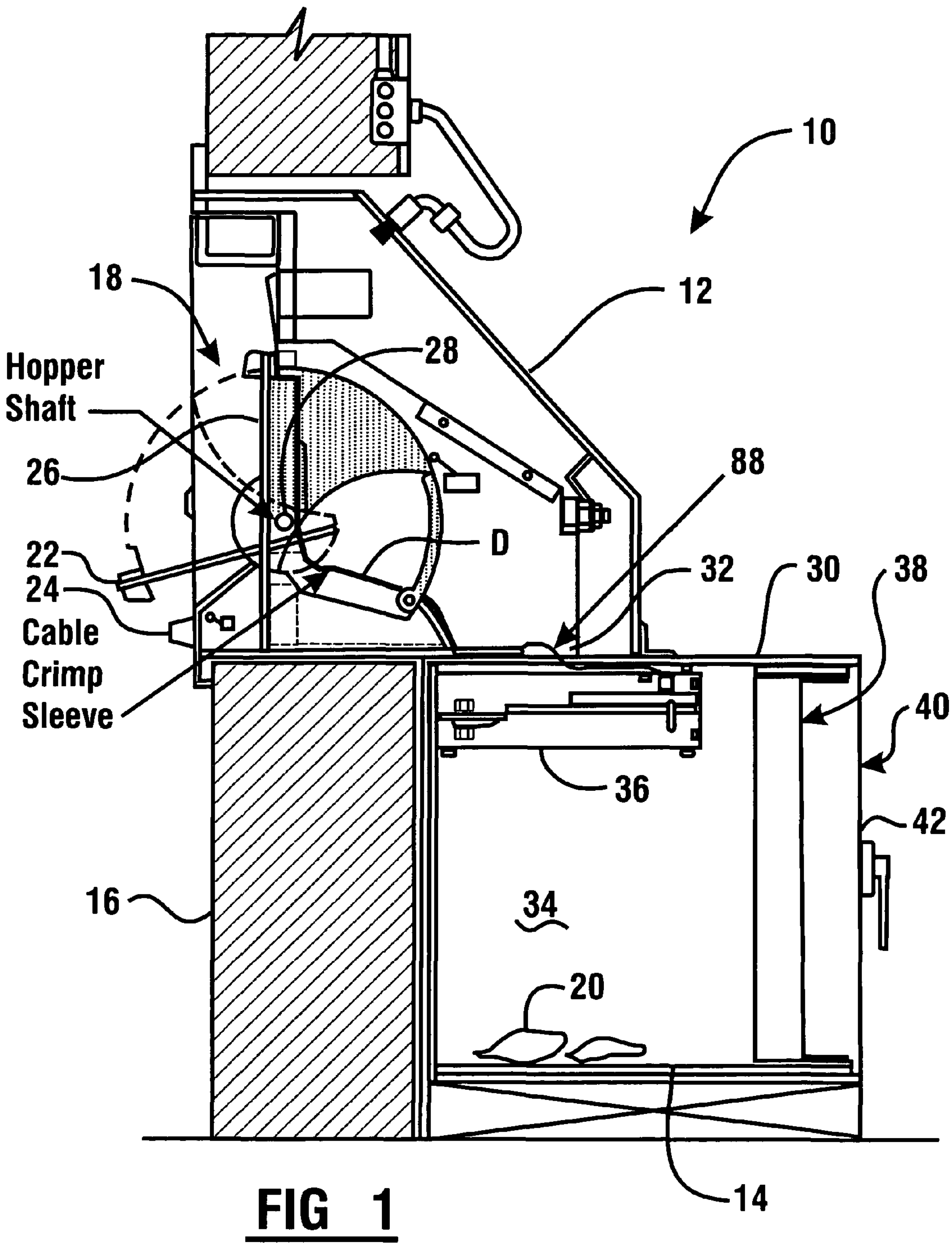
FIG. 1 is a cross sectional view of an exemplary apparatus.
Figure 2:
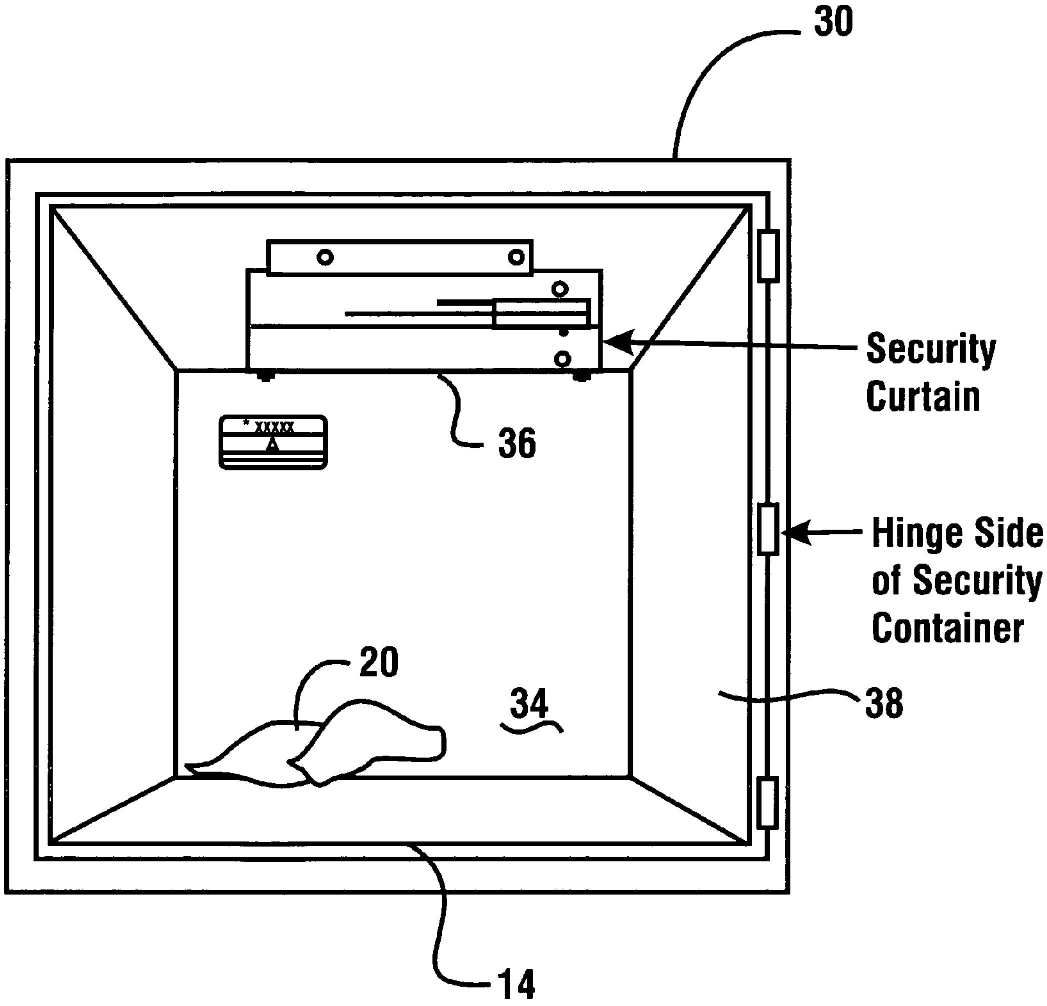
FIG. 2 is an isometric view of an exemplary secure chest including a security curtain mounted below a chest wall opening in the top of the chest.

Referring now to the drawings and particularly to FIG. 1, there is shown therein an exemplary apparatus protected via alarms and indicators to prevent burglary and theft and including a depository 10. Depository 10 includes a depository head 12. Depository 10 further includes a secure chest 14. In this exemplary embodiment the depository head extends through a building wall 16. Building wall 16 may in some embodiments be an exterior wall of a bank building or similar structure. As shown in FIG. 1, in this exemplary embodiment the secure chest 14 is positioned within the interior of the building bounded by the building wall.

Depository head 12 includes a head opening 18. Head opening 18 is configured to accept therein deposit containers 20. In the exemplary embodiment the deposit containers comprise deposit bags which can include financial instrument sheets. These financial instrument sheets may include items of value such as bills, checks, credit card receipts, traveler's checks or other items. Of course this approach is exemplary, and in other embodiments other approaches may be used.

Figure 3:
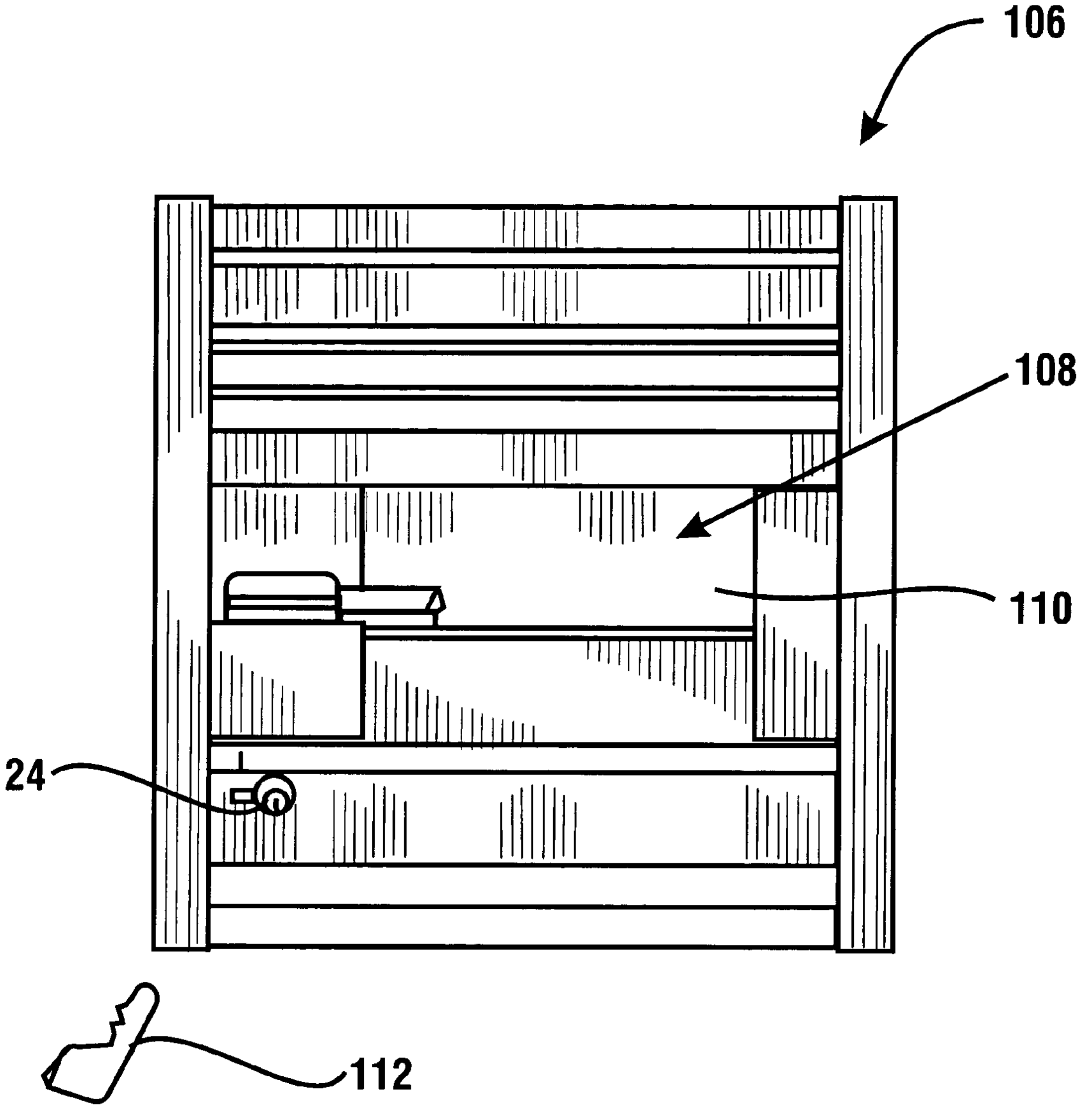
FIG. 3 is a plan view of the front of an alternative exemplary apparatus.

In the exemplary embodiment the head opening 18 is accessible by opening the head door 22. The head door is generally held in a closed position by a lock or similar device which may be for example, a key lock such as key lock 24 shown in more detail on the depository in FIG. 3. In exemplary embodiments authorized users have keys that enable them to open the key lock which enables the head door to be opened. With the head door in the open position, the authorized user is enabled to insert a deposit container through the head opening. When the head door is closed, the lock is operative to hold the head door in the closed position until another authorized user operates the key lock. In other embodiments other types of locks may be used. Such locks may include for example, locks that open in response to numerical inputs or biometric inputs or combinations thereof. Alternative devices may include the features included in U.S. Pat. No. 7,243,838, the entire disclosure of which is incorporated herein by reference.

In the exemplary embodiment the depository head includes at least one movable member 26. In the exemplary embodiment shown in FIG. 1 the at least one movable member is in operative connection with the head door and is movable in response to the position thereof. For example in this exemplary embodiment when the head door is open, the at least one movable member is in a blocking position in which the member operates to prevent access through the head opening to the secure chest. When the head door is moved to the closed position, the blocking member is movable to the position indicated "D" in FIG. 1. In this position the blocking member enables a deposit container which has been placed in the depository head to move therefrom and into an opening in the top wall of the secure chest as later discussed. Further in this exemplary embodiment a depository head 12 the at least one blocking member is rotatable about an axis associated with the shaft 28. The head door and movable members may be mechanically connected by a gear rack or other mechanical or electromechanical linkage. Of course this structure is exemplary and in other embodiments other approaches may be used.

In the exemplary embodiment shown in FIG. 1 the depository head 12 is positioned above a top wall 30 of the secure chest. An opening 32 extends in the top wall. Opening 32 is sized such that in the open condition deposit containers that have been placed in the head are enabled to pass downward through the opening and into an interior area 34 of the secure chest.

In the exemplary embodiment a security curtain assembly 36 is positioned below the chest opening. As later described in detail the exemplary security curtain assembly includes a plurality of movable plate members. These movable plate members in a retracted or open position enable deposit items to pass through the opening and into the interior area of the secure chest. However, in response to actuation of an actuator, the movable plate members move horizontally to a blocking position in which they block access through the opening in the chest, thus preventing access thereto through the opening in the top wall.

In the exemplary embodiment the secure chest includes a deposit container removal opening 38. The deposit container removal opening has access thereto controlled by a hinged door 40. The chest door 40 includes a lock 42 thereon. The chest lock is operative so as to only enable authorized personnel to gain access to the interior area of the chest. For example, in some embodiments a mechanical or electronic combination lock may be used. Of course this approach is exemplary and in other embodiments, other approaches may be used.

FIGS. 13-16 and 20 show the exemplary security curtain assembly 36. The exemplary curtain assembly includes a rectangular frame 44. The frame includes ears 46. Ears 46 include openings that accept fasteners that facilitate attachment of the security curtain assembly to the inside of the top wall of the chest.

The frame also includes a pair of parallel side walls 48. The side walls 48 include slots 50 that extend therein. In the exemplary embodiment the slots 50 include parallel slots of varying lengths. In the exemplary embodiment the slot that is positioned furthest away from the chest wall opening is longer than the other slots for reasons that will be come apparent. Of course this approach is exemplary and in other embodiments other approaches may be used.

Figure 14:
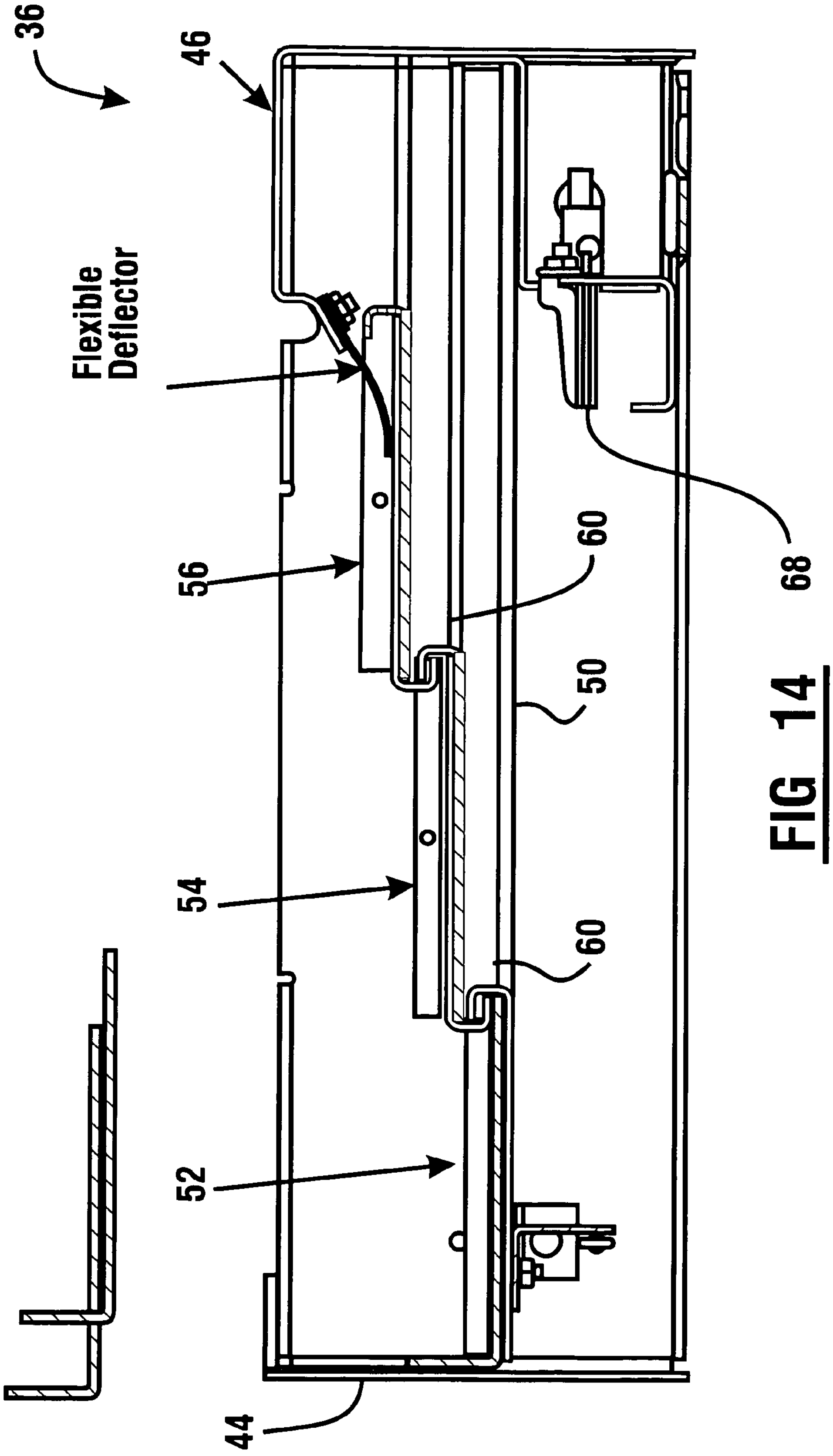
FIG. 14 is a side sectional view showing the security curtain of FIG. 13 in a closed position.
Figure 15:
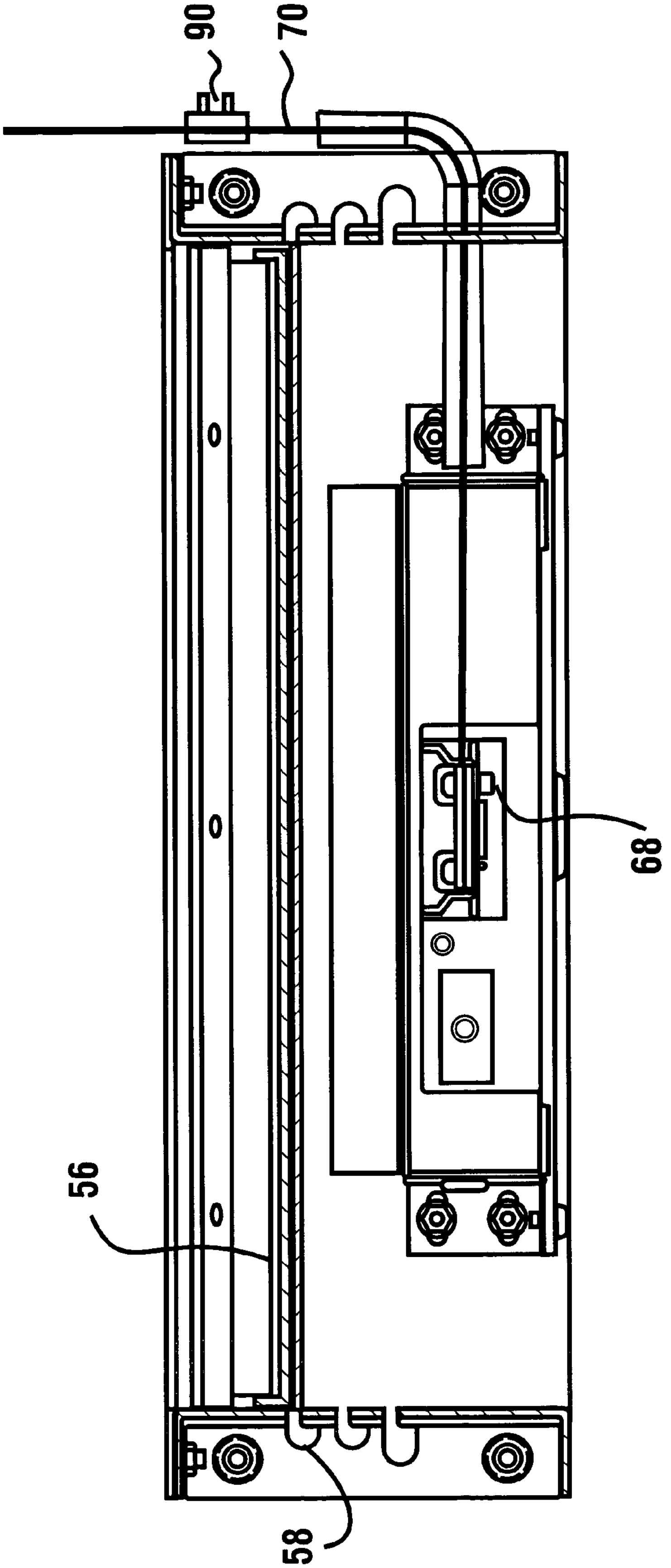
FIG. 15 is a rear view of the security curtain shown in FIG. 14.
Figure 16:
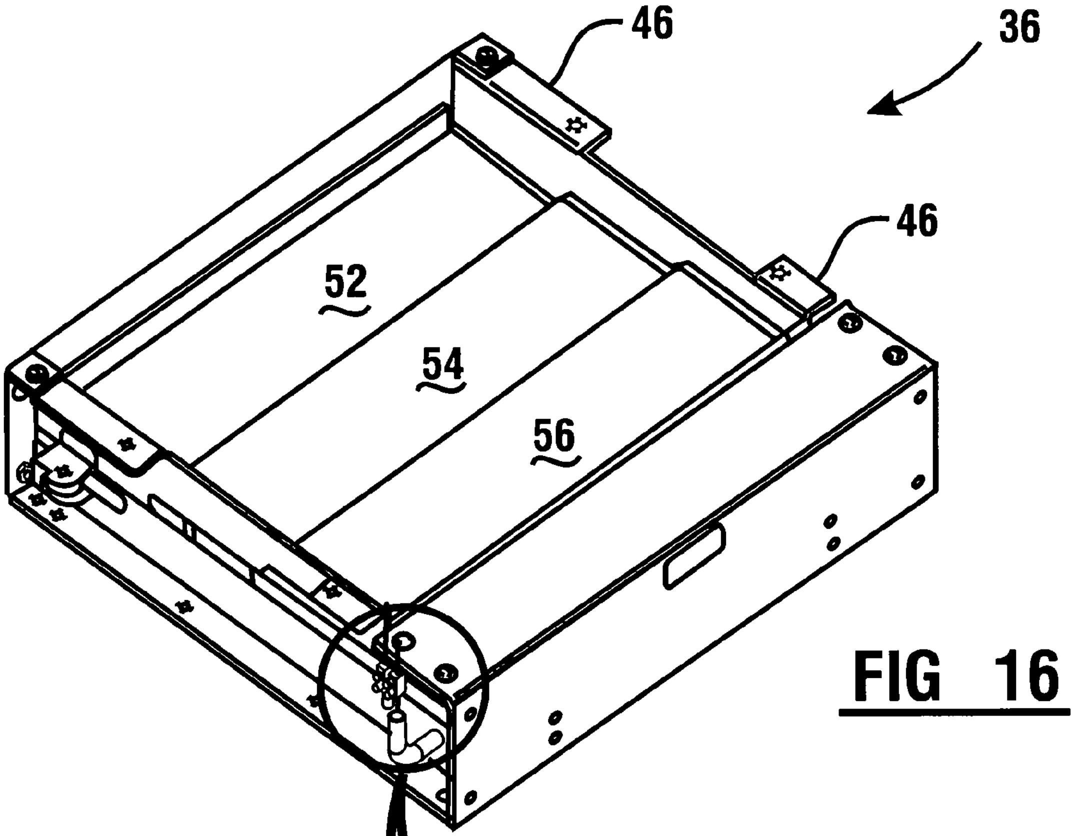
FIG. 16 is an isometric view of the exemplary security curtain.
Figure 17:
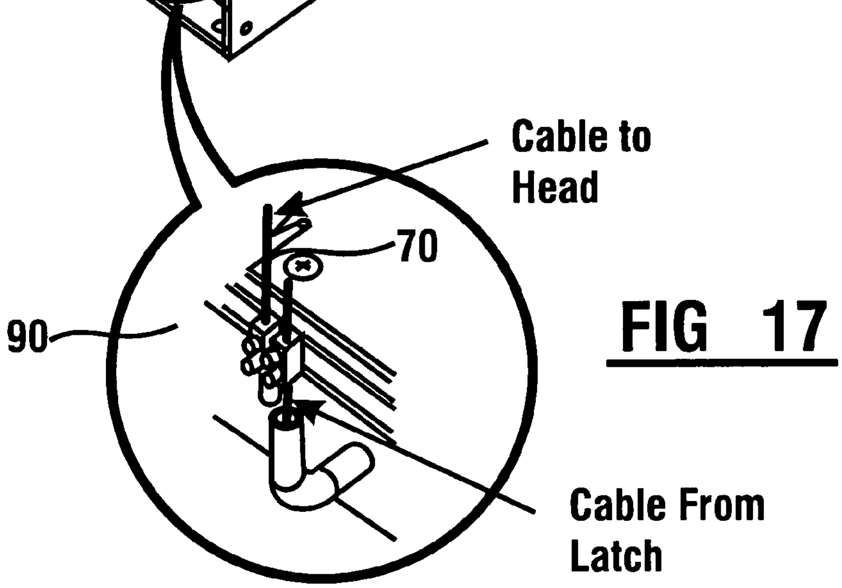
FIG. 17 is an isometric view showing an exemplary releasible connector operative to mechanically trip an actuator for the security curtain.

The exemplary curtain includes a plurality of movable plate members 52, 54 and 56. Each of the plate members have projections 58 (see FIG. 15). Projections 58 extend in the slots and enable movement of the projections on movable plate members therein. As a result, the plate members can move in guided relation by their respective slots. As best shown in FIG. 14, each of the plates further include interengageable hook portions 60. Hook portions 60 are configured so that when plate 52 is moved to the left as shown in FIG. 14, plates 54 and 56 are disposed to the left as well as a result of engagement of the hook portions. Of course this approach is exemplary and in other embodiments other approaches may be used.

A pair of springs 62 and 64 are in operative connection with movable plate member 52. Springs 62 and 64 of this exemplary embodiment comprise torsion springs and retractable tape members that are biased to retract in a jellyroll fashion. As a result springs 62 and 64 bias the movable tape members toward a plate shut position like that shown in FIGS. 13, 14 and 16, such that the plates block access through the chest opening in the top wall of the chest to the interior area of the chest. Of course it should be understood that while the torsion and tape spring arrangement is described in the exemplary embodiment, in other embodiments other approaches may be used.

Figure 12:
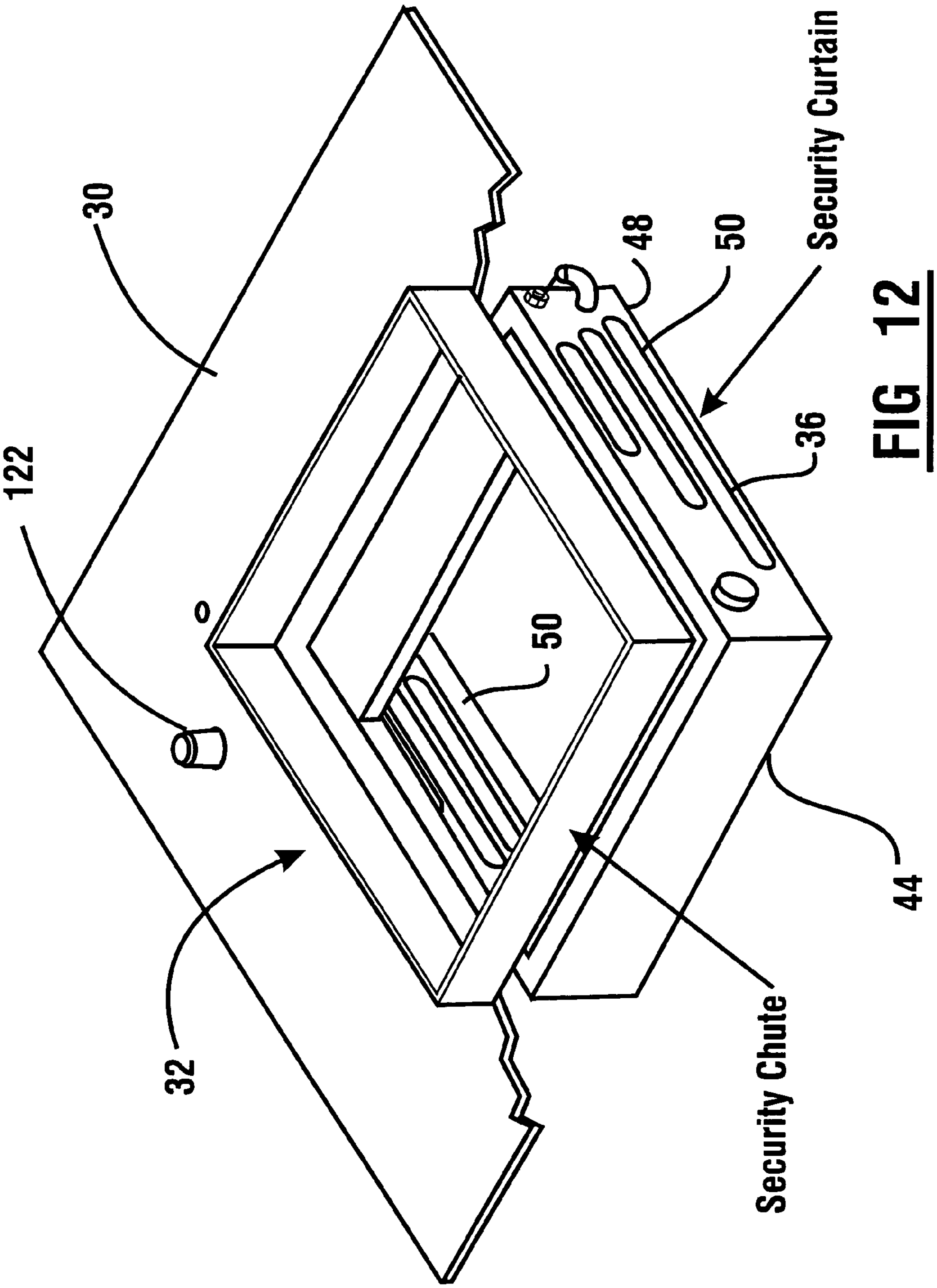
FIG. 12 is an isometric view showing an opening and a top wall of a chest and an exemplary security curtain positioned within the chest below the opening.

The exemplary plate member 52 includes a pin 66. The exemplary pin extends downward from plate member 52. When pin 66 is disposed toward the retracted position (upward in FIG. 13 and to the right in FIG. 14), pin 66 can be engaged and held by a latch 68. The exemplary form of latch 68 is a hook type latch that holds pin 66 in engagement therewith. In the exemplary embodiment the latch is in operative connection with an actuator which causes latch 68 to release the pin 66. As can be appreciated when the pin 66 is released the plates move in response to the force of the springs from a plate open position like that shown in FIG. 12 to the plate shut position shown in FIGS. 13, 14 and 16.

An actuator is operative to cause the latch 68 to release the pin. In one exemplary embodiment the actuator includes a cable 70. Cable 70 operates in the exemplary embodiment to move at least one member in the latch which causes the release of the pin. Of course it should be understood that this approach is exemplary and in other embodiments, other approaches may be used.

Figure 20:
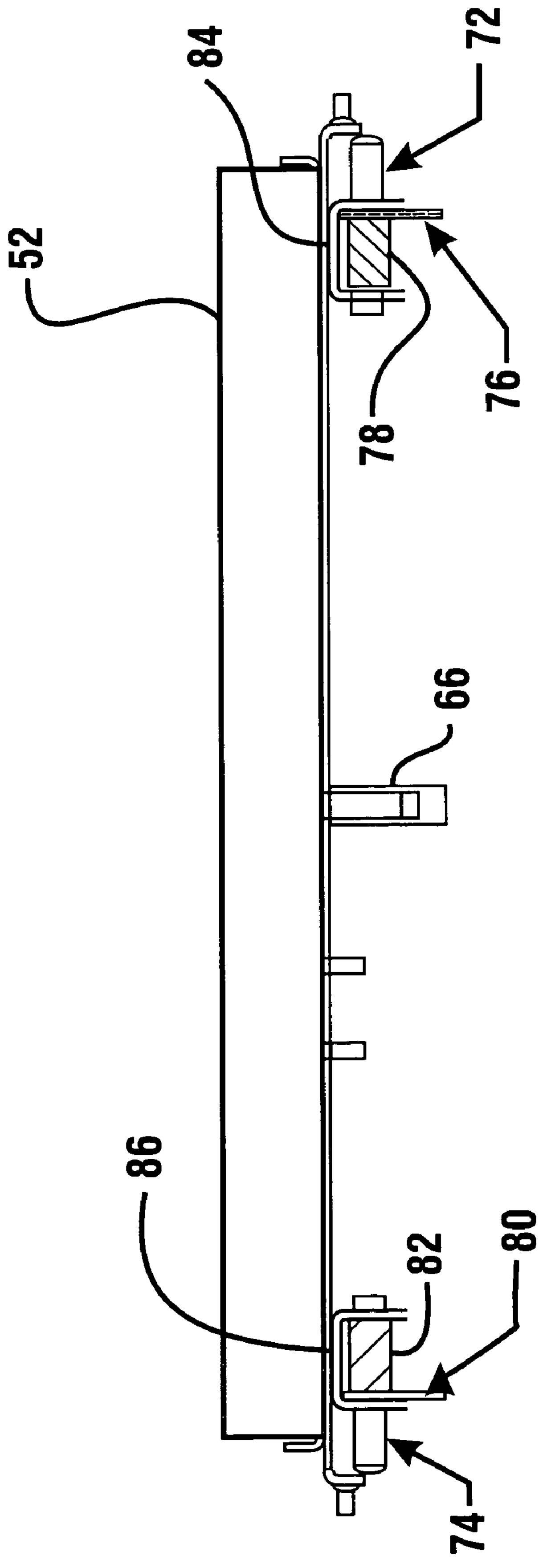
FIG. 20 is a plan view of a movable plate member including an exemplary catch and release member.

A further aspect of the exemplary security curtain assembly 36 is that once the security curtain has moved to the closed position, the movable plate members cannot be readily moved back to the plate open position from outside the chest. This is accomplished through the use of a catch which is operative to hold the movable plate members in the plate shut position. The exemplary catch includes a pair of pins 72 and 74 that are movable on plate 52 as shown in FIG. 20. Pin 72 has a tab 76 attached thereto. Tab 76 is biased outward relative to the plate member by a spring 78. Likewise pin 74 has a tab 80 attached thereto. Tab 80 is biased outward by a spring 82. Pins 72 and 74 are movable in openings in U-shaped brackets 84 and 86 respectively.

In the exemplary embodiment the side walls 48 of the frame 44 include apertures therein (not separately shown). The apertures are configured to accept pins 72 and 74 therein when movable plate member 52 moves to the plate shut position. As a result when the movable plate members move to close the opening through the top of the chest, the pins move and engage the apertures. As a result the pins in engagement with the apertures comprise a catch which is operative to hold the movable plate members in the plate shut position.

Once in the plate shut position the plates remain in the shut position until pins 72 and 74 are released from engagement with the apertures. This is accomplished in the exemplary embodiment by manually moving tabs 76 and 80 inboard so as to retract the pins. With the pins retracted, the movable plate members can be moved to the plate open position and pin 66 can be reengaged with latch 68. Thus tabs 76 and 80 provide a manually engageable release that enables releasing the catch which holds the movable plate members in the plate shut position.

Further in an exemplary embodiment the manual release may only be actuated from inside the secure chest. As a result once the security curtain has moved to a closed position the plates can only be retracted by a person releasing the catch by opening the chest door and engaging the release through the deposit container removal opening. This helps to provide enhanced security. Of course it should be understood that this approach is exemplary and in other embodiments other approaches may be used.

Figure 19:
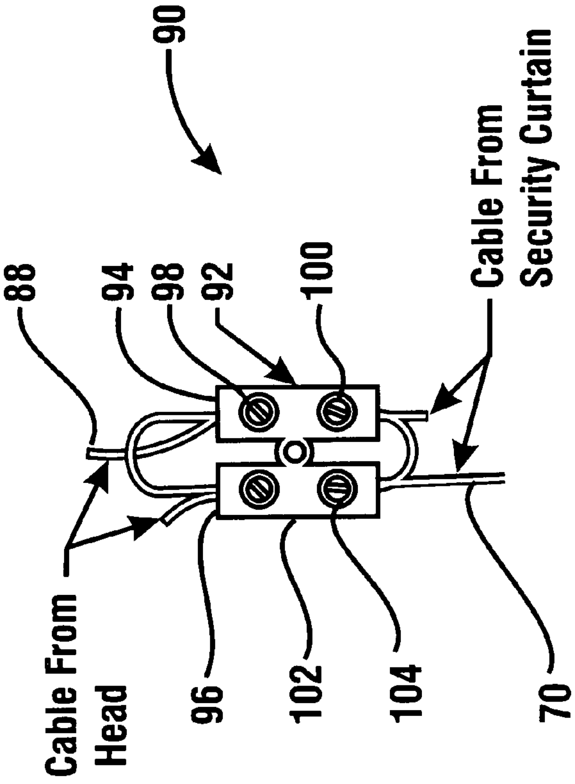
FIG. 19 is an enlarged view of the releasible connector of an exemplary embodiment.
Figure 18:
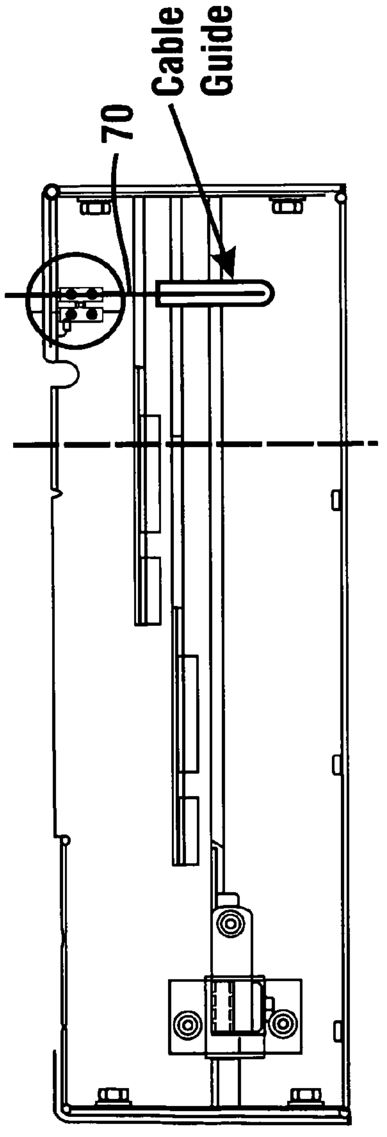
FIG. 18 is a side view of the security curtain shown with the movable plate members in a blocking position, closing the opening in the chest wall.

In the exemplary embodiment shown in FIG. 1 the actuator for the latch 68 comprises at least one cable. As shown in FIG. 1 in this configuration of the depository head, a cable 88 is operatively connected to the depository head and is attached to shaft 28. Shaft 28 may rotate without moving the cable 88, but movement of the shaft in a non-rotational manner moves the cable. The cable 88 is in operative connection with cable 70 which extends to the latch 68 through a releasible connector 90. The exemplary releasible connector 90 is shown in greater detail in FIG. 19. The releasible connector comprises a body 92. Body 92 has a first cylindrical passage 94 extending therein. Passage 94 is sized for accepting at least one cable therethrough. Body 92 also includes a second cylindrical passage 96. Second cylindrical passage 96 is also sized for accepting at least one cable therethrough. A pair of threaded fasteners 98, 100 are mounted on body 92 and are movable through rotation thereof so as to selectively extend inward in the cylindrical passage 94. Likewise fasteners 102 and 104 are movably mounted on body 92 and are rotatable so as to selectively extend in passage 96.

As can be appreciated the structure of releasible connector 92 enables cables 88 and 70 to be extended in each of the cylindrical passages 94 and 96 and secured therein by tightening fasteners 98, 100, 102 and 104. However, when it is desired to move the depository head for servicing, the releasible connector 90 may be readily disconnected by loosening the threaded fasteners and removing the cables from the cylindrical passages. As a result the depository head may be readily moved relative to the chest portion without actuating the security curtain. Further as can be appreciated, once the depository head has been returned to an operative position any slack in the cables can be readily removed by positioning the cables within the body of the releasible connector. Thus the actuator which operates to release the movable plate members can be set so that any significant amount of movement of the depository head relative to the chest is operative to cause the security curtain to block access between the depository head and the interior area of the chest. Of course this approach is exemplary, and in other embodiments other approaches may be used.

Figure 4:
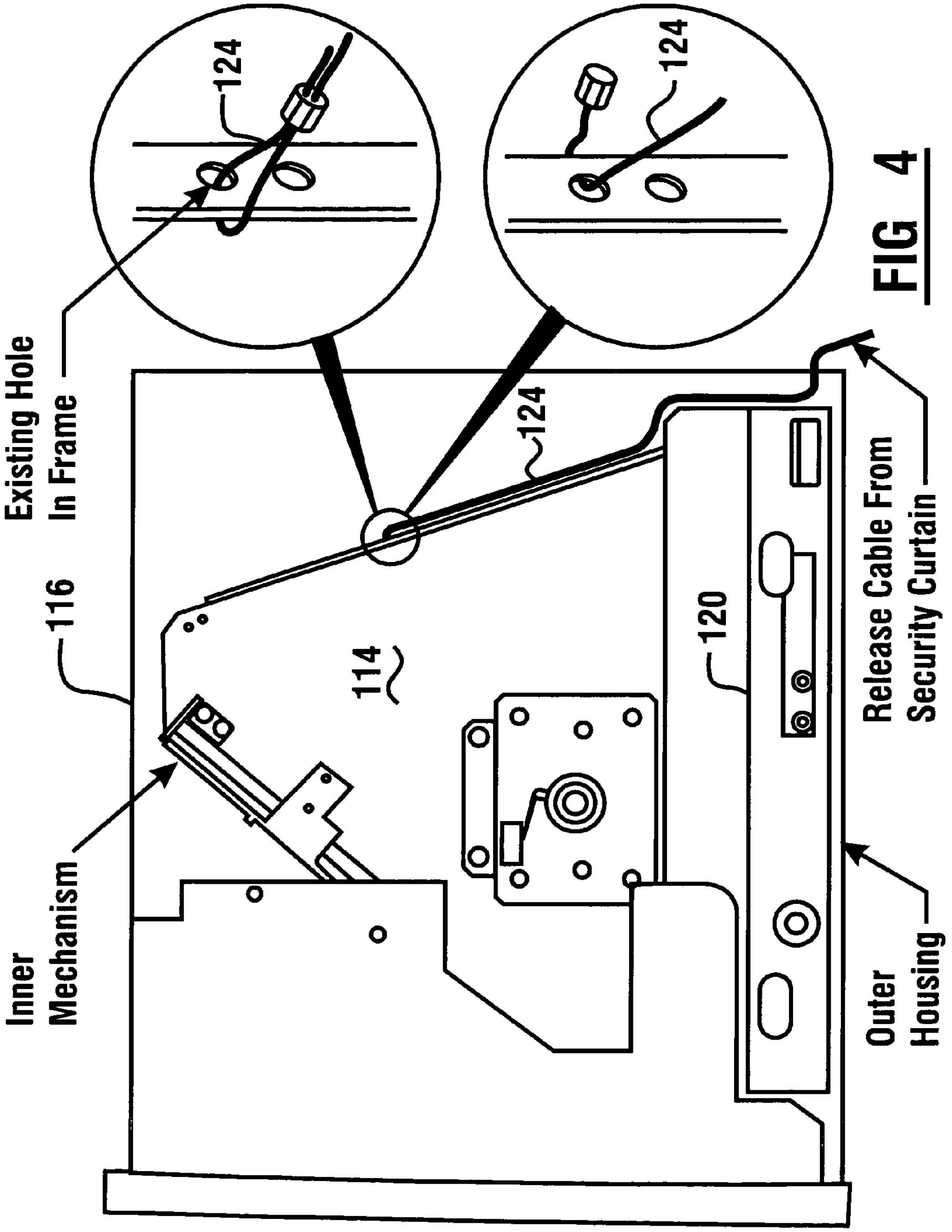
FIG. 4 is a side view of the exemplary apparatus shown in FIG. 3.
Figure 5:
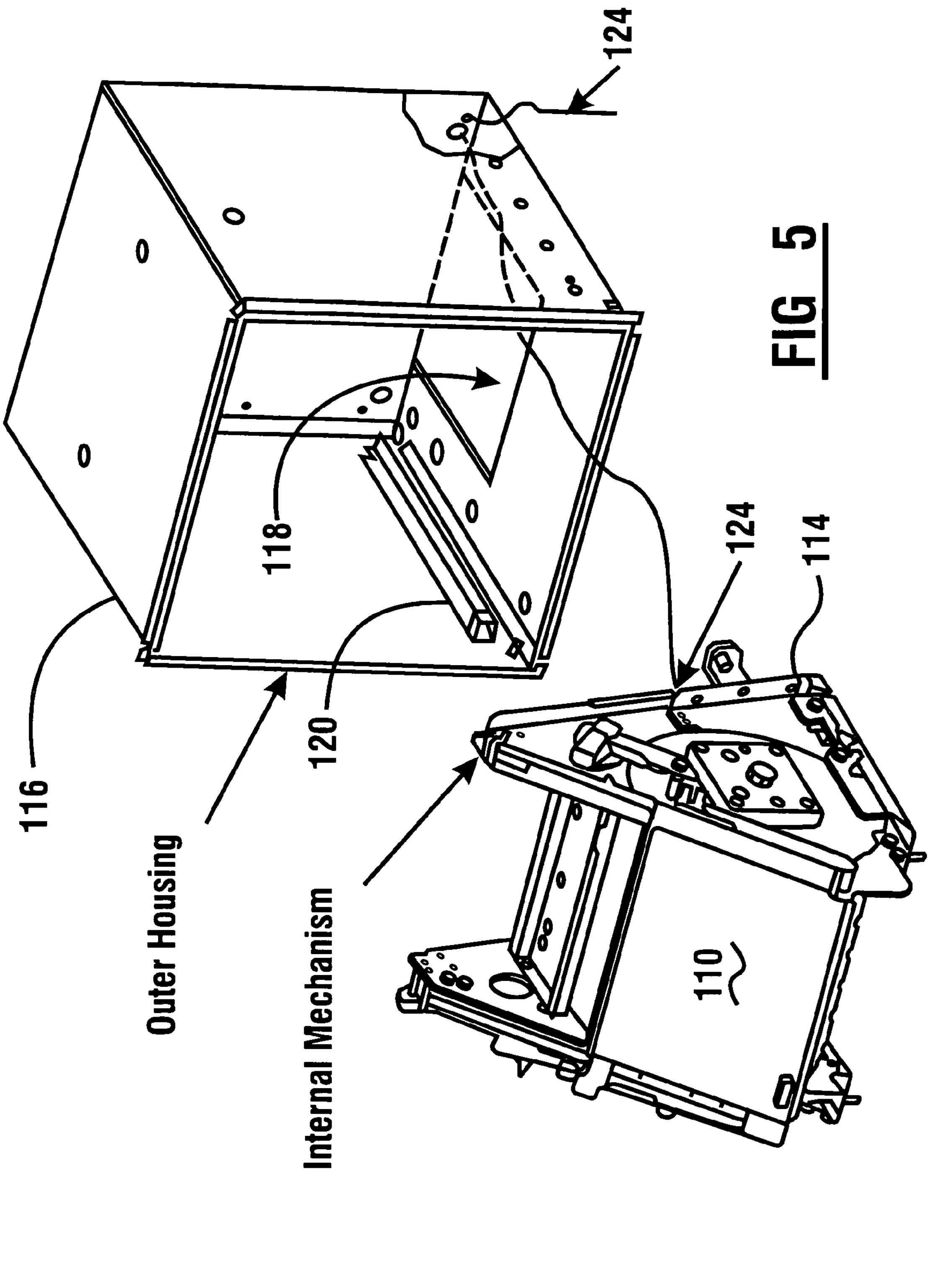
FIG. 5 is an exploded isometric view of a depository enclosure shown with the head moved outward for servicing.
Figure 6:
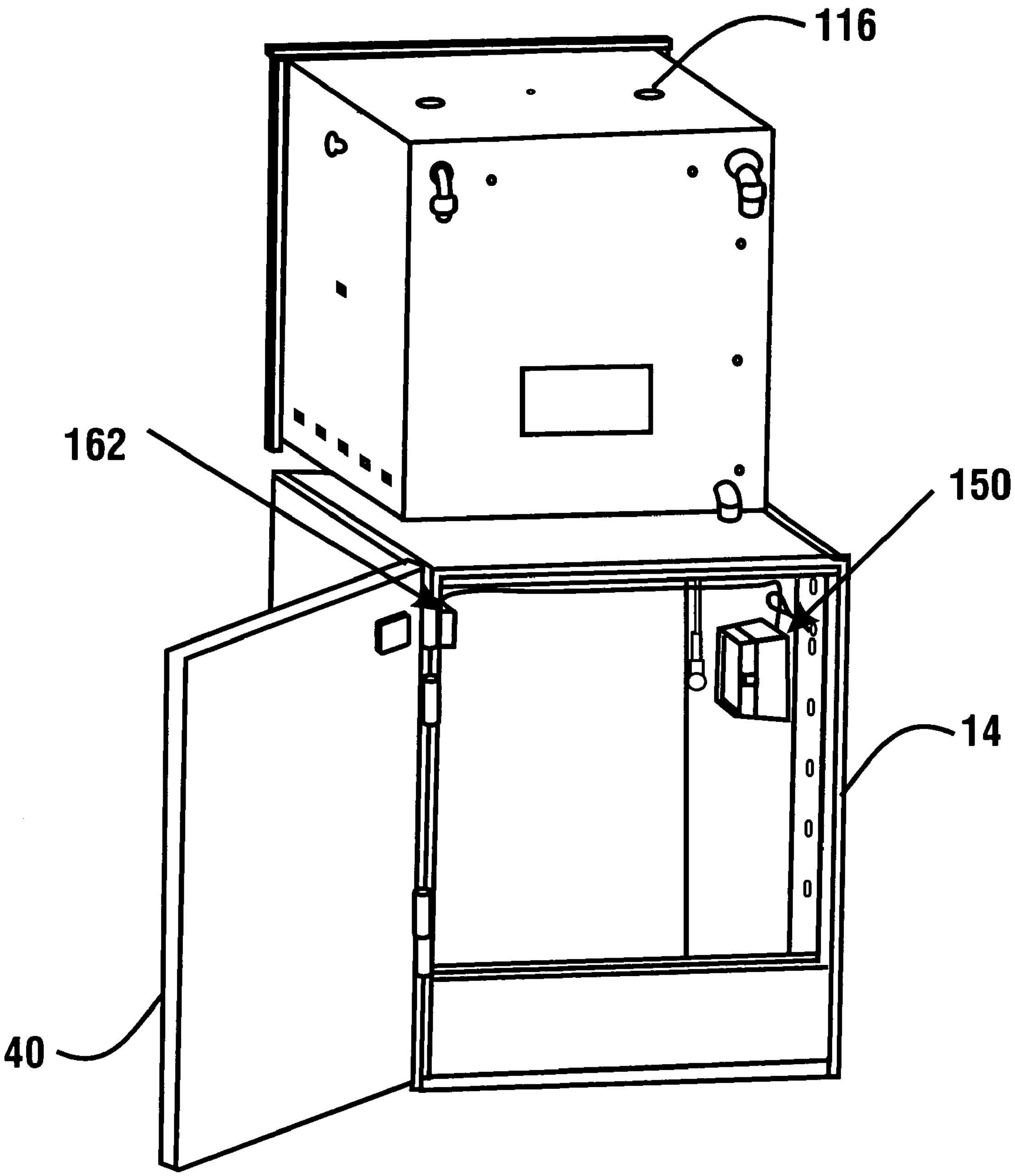
FIG. 6 is a rear isometric view of a depository head housing and secure chest.

The exemplary embodiment may be used in connection with numerous different types of depository structures. FIGS. 3 through 6 for example show an alternative type of depository 106. This depository includes an opening 108 that is normally held closed by a door 110. Door 110 can be opened by selected persons using keys 112 which are operative to open a lock 24 as previously discussed. As a result authorized persons are enabled to place deposit containers in the opening and into the depository head. As shown in FIGS. 4, 5 and 6 in this embodiment the depository head 114 when in an operative position, is housed within an upper housing 116. Upper housing 116 includes an opening 118 that corresponds to the opening in the top wall of the chest. Further in this exemplary embodiment the upper housing includes brackets 120. Brackets 120 provide support for the head 114. Further the brackets 120 also enable authorized persons to move the head 114 out of the upper housing 116 for purposes of servicing. In the operative position the depository head 116 may be secured within the upper housing by one or more pins which engage the head and hold it in the operative position. This may be for example an upward extending pin such as pin 122 shown in FIG. 12. In this exemplary embodiment the pin 122 may only be retracted downward from within the interior area of the secure chest. Thus this configuration helps to resist any attempted movement of the depository head 114 outward from the upper housing 116. Of course this approach is exemplary and in other embodiments other approaches may be used.

In this exemplary embodiment a cable 124 serves as an actuator. As can be appreciated if the depository head is moved outward while the cable 124 is operatively connected to the security curtain, the movable members will move to block the opening into the top of the secure chest. Of course it should be understood that this approach is exemplary and in other embodiments other approaches may be used.

Figure 9:
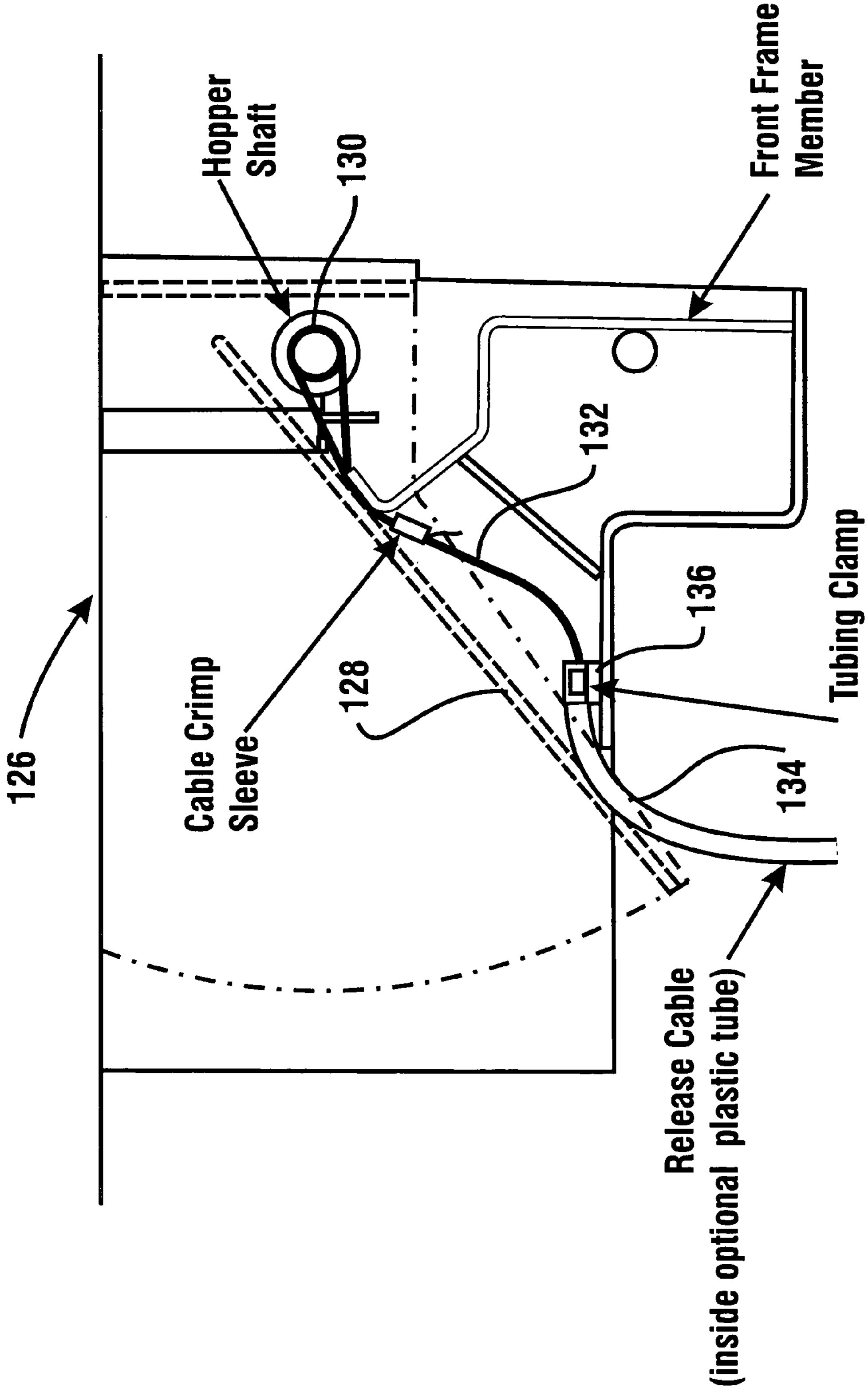
FIG. 9 is a transparent side view of an alternative depository head including a connecting member attached to a rotatable shaft.

FIG. 9 shows yet a further alternative configuration for a depository and actuator for a security curtain. In this embodiment the depository head 126 includes movable members 128 that rotate about a hopper shaft 130. The cable 132 serves as an actuator for a security curtain. The cable 132 is operatively connected to the hopper shaft 130. Thus if the hopper shaft is transversely displaced relative to the chest, the cable will move and cause the latch of the security curtain to release the movable plate members to move toward the plate shut position. Further in this exemplary embodiment the cable 132 is movably extended in a guide 134. The guide 134 in this exemplary embodiment serves as a sheath that helps to facilitate guiding the cable while enabling it to move without catching on other features of the depository head of the secure chest. A clamp 136 facilitates securing the leading edge of the guide 134 so as to maintain its position on the depository head. Of course this approach is exemplary and illustrative of the different configurations in which the principles discussed herein may be applied.

Figure 10:
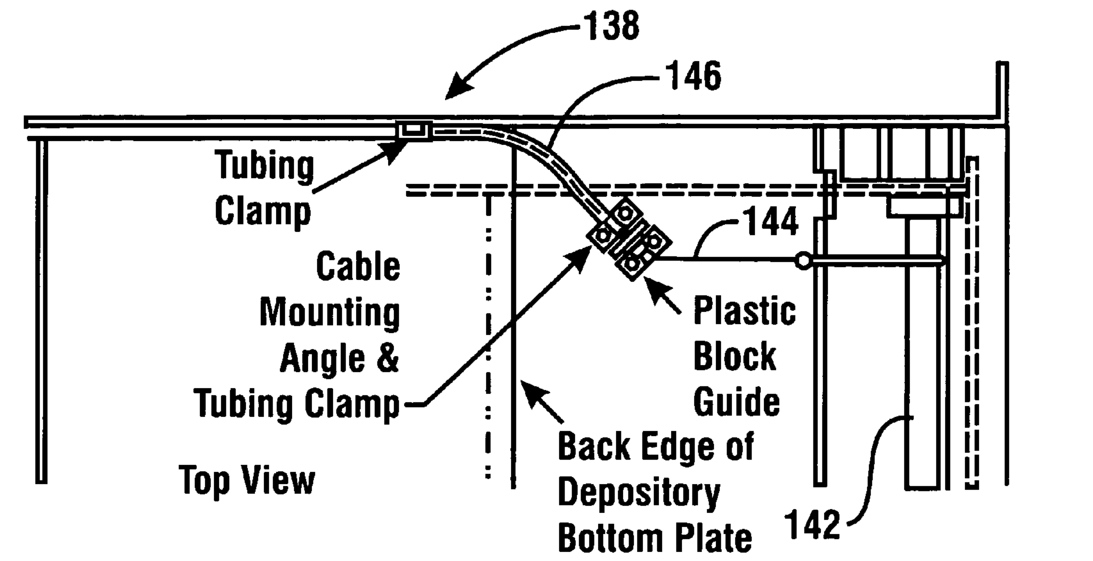
FIGS. 10 and 11 are a top view and side view respectively of yet another alternative depository head with a connecting member attached to a rotatable shaft.
Figure 11:
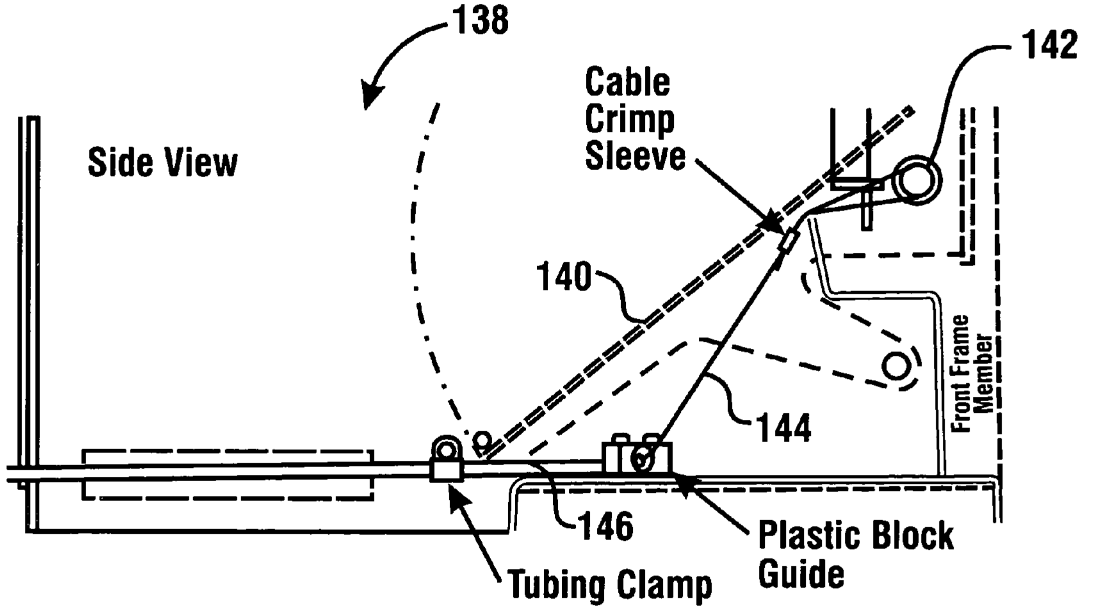

FIGS. 10 and 11 also show alternative configurations of a depository head 138. As can be appreciated only pertinent portions thereof are shown. In this depository head movable members 140 are operative to move and guide depository items into the opening in a top wall of the secure chest while at the same time blocking access from the opening in the depository head to the chest. This exemplary embodiment further includes a shaft 142 which has a central axis about which the movable members rotate. A cable 144 is operatively connected to a shaft 142. The cable 144 in the exemplary embodiment is operatively connected to the latch of the security curtain and serves as an actuator therefor. Cable 144 runs through a guide 146 which performs the functions previously described that facilitate movement of the cable without catching on components of the depository head or the chest.

While some embodiments may operate to cause the security curtain to close in response to mechanical actuation resulting from relative movement of one or more head structures, others may include different features. Such alternative systems may include methodologies for actuating the security curtain in response to one or more types of electronic sensors. Such a system is shown in FIG. 21.

Figure 7:
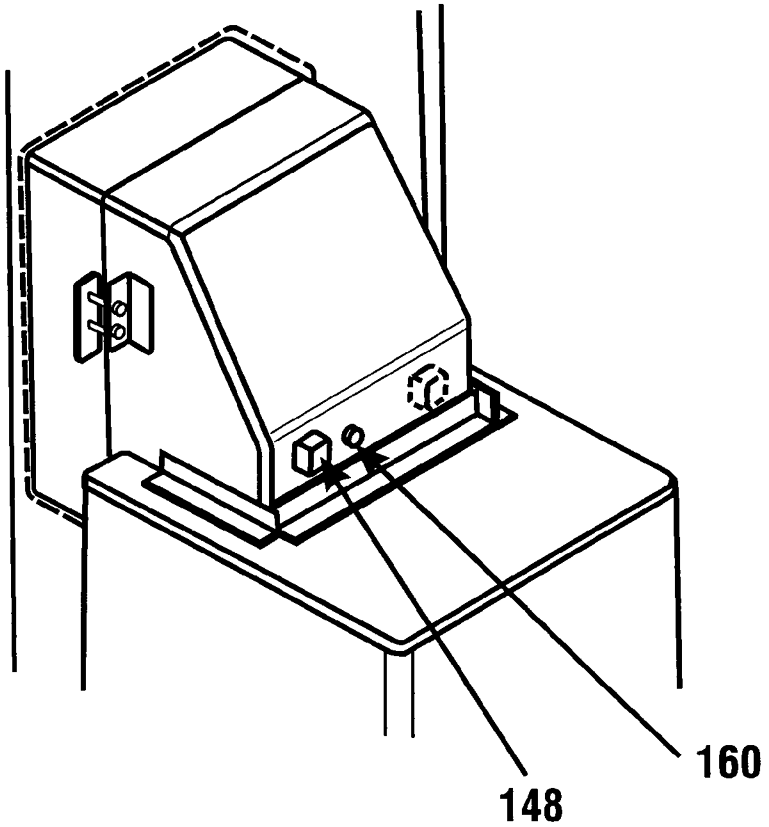
FIG. 7 is a rear isometric view of yet another depository head positioned above a secure chest including a vibration sensor and annunciator mounted thereon.

In this exemplary embodiment a vibration sensor 148 is attached in operative connection to the depository head. Although the vibration sensor may be attached in various locations, in some embodiments it may be attached to the depository head housing in a manner like that shown in FIGS. 7 and 8.

In the exemplary embodiment the vibration sensor is operative to sense oscillating vibrations that correspond to burglar tools such as a reciprocating saw and/or a rotating saw that would be used by a criminal to attack mechanisms in the depository head. In the exemplary embodiment the vibration sensor is configured to operate in conjunction with sensing circuitry that operates to sense vibration that corresponds to burglar tools such as a saw, but does not result in giving false alarms due to vibrations sensed from operation of the depository head, the movement of deposit bags, ambient vibrations due to passing vehicles or other conditions that cause vibration but which are not generally associated with an attack. Further it should be understood that while only one vibration sensor is shown, alternative arrangements may include multiple sensors at disposed locations on the depository head and chest. Such multiple sensors may be operative to provide additional or redundant signals that can be used for analysis purposes and verifying the character of the vibrations sensed. Of course this approach is exemplary, and in other embodiments other approaches may be used.

Figure 21:
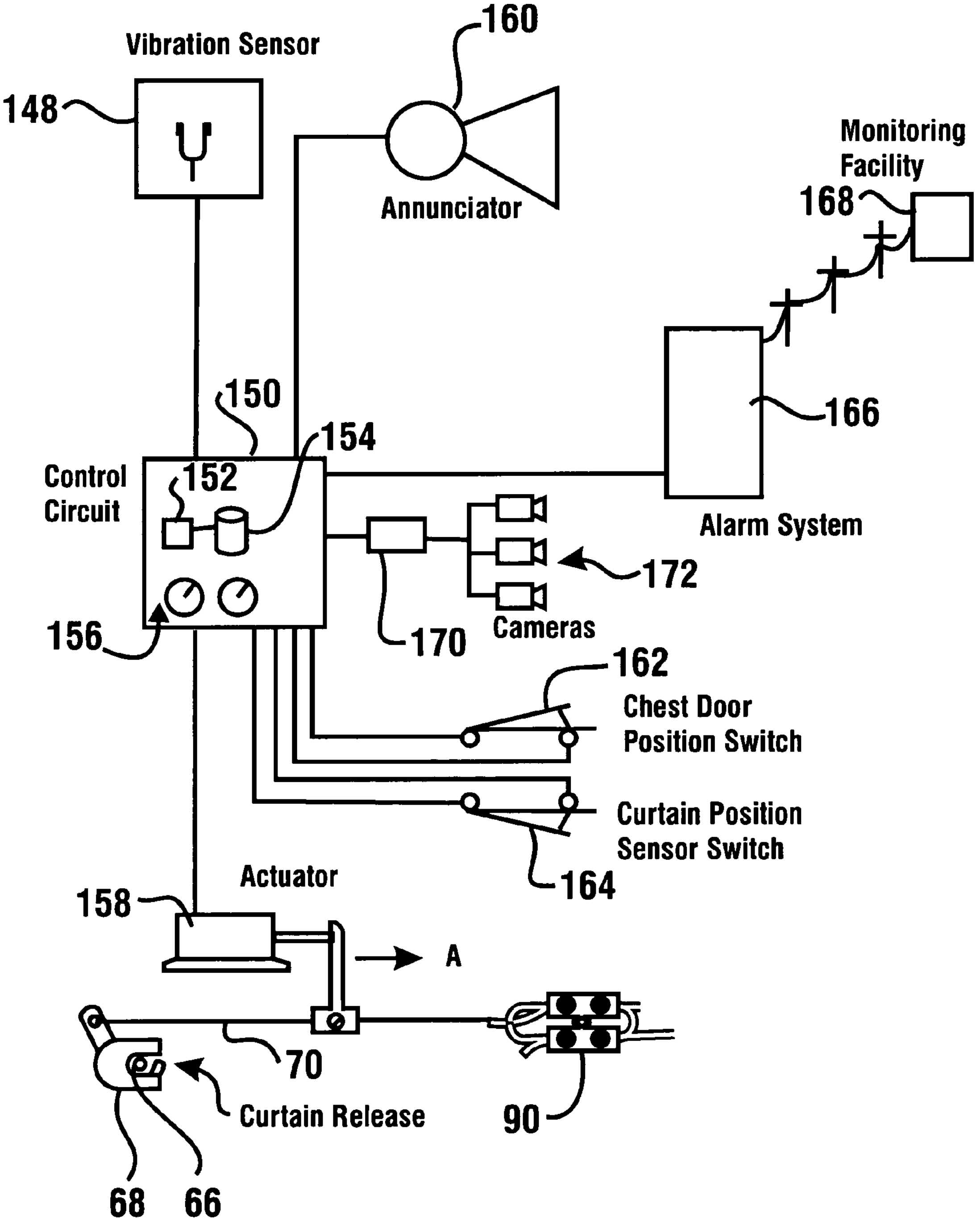
FIG. 21 is a schematic view of a system including a vibration sensor and circuitry associated with an exemplary embodiment.

As shown in FIG. 21 the vibration sensor or sensors is operatively connected to at least one circuit schematically represented 150. The at least one circuit 150 in the exemplary embodiment is operative to receive and analyze signals from the vibration sensor. The at least one circuit may include appropriate signal amplification, filtering and other signal conditioning and/or analysis circuitry which are operative to facilitate analysis of the vibration signals to identify conditions which correspond to vibrations associated with contact by reciprocating or rotating saw blades, and distinguish those vibrations from other conditions. Some exemplary circuits may include a processor 152 and at least one data store 154. The processor and data store in some exemplary embodiments enable programming of the at least one circuit of the control circuitry so as to facilitate programming that identifies vibrations corresponding to attacks and to distinguish them from other signals. In addition exemplary embodiments may provide for updating the programming to improve the analysis as new methods for attacks become known.

Further some embodiments may include manual or programmable adjustments that enable a user to set certain parameters of the circuitry. These may include for example the ability to adjust the sensitivity of the circuitry with regard to amplitude and/or frequency by adjusting amplitude and/or frequency controls. A user can selectively establish the properties of the vibrations which must be sensed before at least one signal is output by the circuitry indicative of attack by a burglar tool are indicated. Of course it should be understood that in some embodiments adjustments related only to amplitude or frequency may be used as well. The adjustment capabilities are represented schematically in FIG. 1 by adjustable controls 156. Of course these approaches are exemplary and in other embodiments other approaches may be used.

As shown in FIG. 21 the exemplary system includes an electromechanical mechanism which serves as an actuator for the latch 68 of the security curtain. In the exemplary embodiment the actuator includes a solenoid 158. As schematically represented the solenoid 158 can be selectively operated in response to at least one signal output by the at least one circuit 150 to move a cable attachment member in the direction of Arrow A as shown in FIG. 21. Movement of a plunger associated with the solenoid in the direction of Arrow A also can actuate the latch 68 so as to release pin 66. This is shown schematically by solenoid 158 moving cable 170 which is attached to the latch. Further in the embodiment shown schematically, the cable 70 may also be attached to an actuator cable that can mechanically trip the latch 68 in a manner like that described in connection with other embodiments. However, it should be understood that in some embodiments the security curtain may operate only in response to an actuator controlled by the circuitry and that the mechanical actuation caused by movement of the depository head or other physical structure may not be included.

Figure 8:
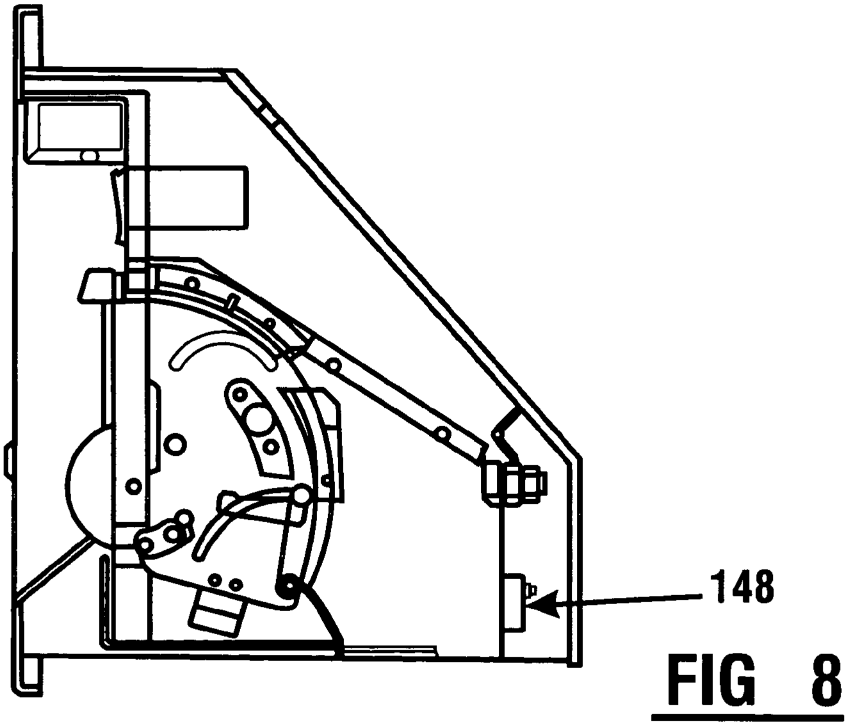
FIG. 8 is a transparent side view of the depository head shown in FIG. 7.

In an exemplary embodiment shown in FIG. 21 the circuit 150 is also in operative connection with an annunciator 160. Annunciator 160 is operative responsive to at least one output signal from the circuit to provide an audible alarm when attack activity is detected. The annunciator can thus sound and scare away burglars that are attacking the depository. The annunciator 160 may be positioned in various areas on or adjacent to the depository. An exemplary mounting of the annunciator is shown in FIG. 8.

Exemplary embodiments may also provide components that avoid the security curtain from closing in situations where it might otherwise be tripped by authorized persons working on the depository. This is accomplished in an exemplary embodiment by providing a chest door switch 162 in connection with the chest door. As represented in FIGS. 6 and 21 the chest door switch is operative to indicate when the chest door is open or closed. If the chest door is open, the exemplary circuitry is operative to prevent the actuation of the security curtain or the giving of an alarm. This is because if the chest door is open, an authorized person has likely gained access to the interior of the chest and thus it would not be appropriate to give an alarm. It should be understood that various types of switching arrangements or other sensors may be used for this purpose.

Figure 13:
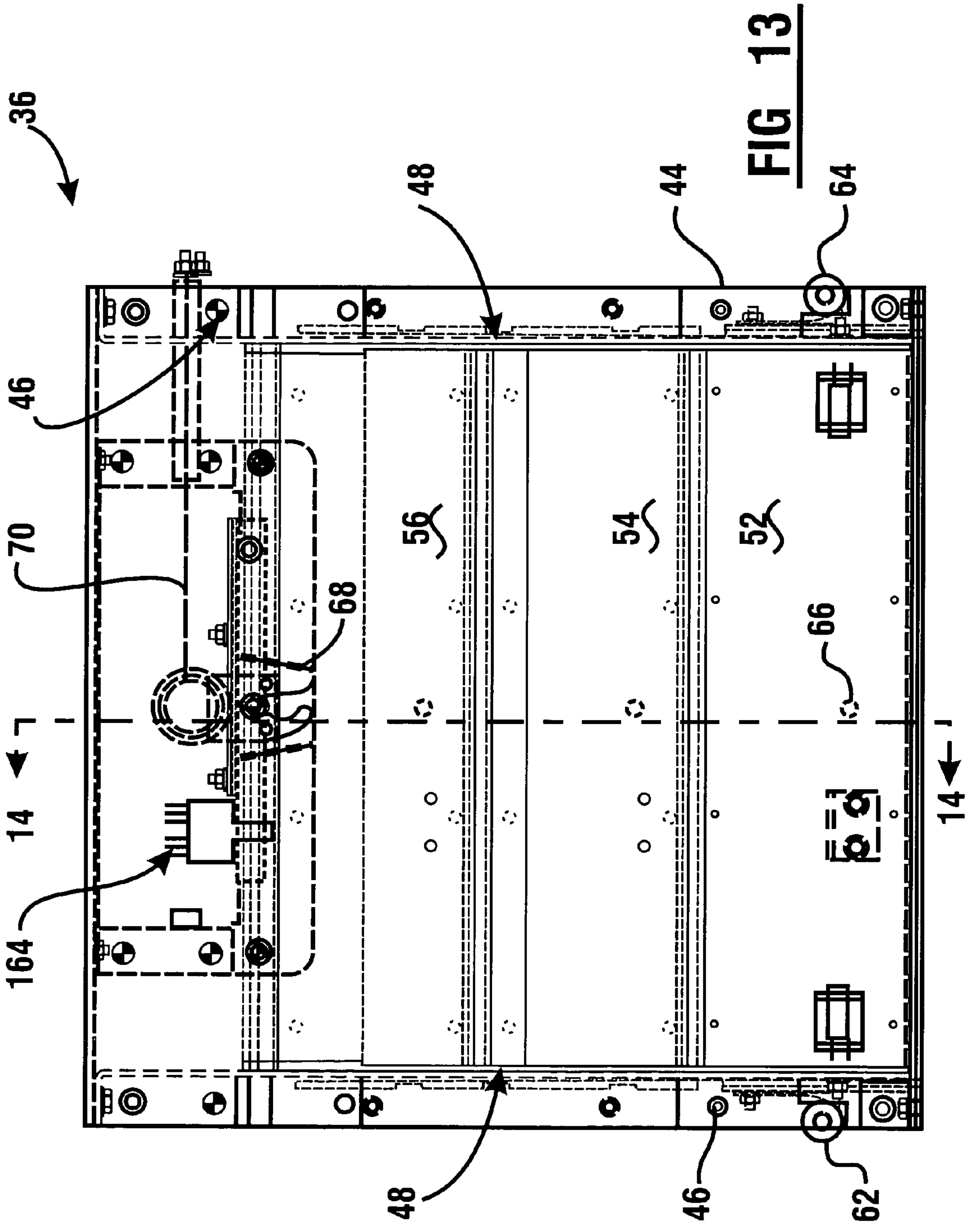
FIG. 13 is a top plan view of an exemplary security curtain.

In addition the exemplary embodiment further includes a sensor 164 that is operative to sense the position of the movable plate members of the curtain. As shown in FIGS. 13 and 21, the switch 164 senses whether plate member 52 is adjacent to or has disposed away from the switch. This enables the circuit 150 to determine if the curtain has closed in response to the vibration signal. This information on whether the security curtain is shut may be analyzed and/or transmitted to other systems. Alternatively the circuit may operate in accordance with its programming to make additional attempts to actuate the latch 68 if it senses that the curtain has not shut in response to initial attempts at actuation. Of course these approaches are exemplary.

Systems of exemplary embodiments may also operate in conjunction with one or more alarm systems such as the alarm system 166 represented schematically in FIG. 21. The circuit 150 operates in response to determining that sensed vibration corresponds to an attack to cause at least one signal to be output and communicated to the alarm system 166. The alarm system is then operative to provide indications of the alarm condition and take other actions in accordance with its programming capabilities. These actions may include for example sending signals to a remote monitoring facility schematically indicated 168. This notification to the monitoring facility may be given by phone, Internet or other communications and methods. The monitoring facility may in some embodiments be a headquarters facility for a banking institution. Alternatively it may represent an alarm monitoring company or a law enforcement agency. It should be understood that some alarm systems may give notices to multiple remote facilities. Alarm systems for some embodiments may take other action such as sounding alarms, turning on lights, actuating further protective measures or other steps to document or prevent the theft. Of course these approaches are exemplary and in other embodiments other approaches may be used.

In other exemplary embodiments the circuit 150 may be in operative connection with other systems. These may include systems that operate to capture video images and that take programmed steps in response to detecting certain conditions. This is represented in FIG. 21 by a digital video recorder and analysis system 170. The digital video recorder system may be in operative connection with a plurality of image capture devices such as cameras 172. System 170 may operate to capture images, detect events and carry out programmed sequences of activities in response to detecting events in a manner like that described in U.S. Pat. No. 6,583,813 the disclosure of which is incorporated herein by reference. In some systems for example, the video control system may be operative to detect conditions which correspond to an illegal activity occurring. This may be done independent of the vibration sensing or may be analyzed by the system 170 in response to circuitry 150 sensing suspect vibration. In such circumstances the circuitry may output one or more signals that cause closure of the security curtain in response to either signals from the vibration sensor, signals from the digital video analysis, or both. Of course these approaches are exemplary.

Figure 22:
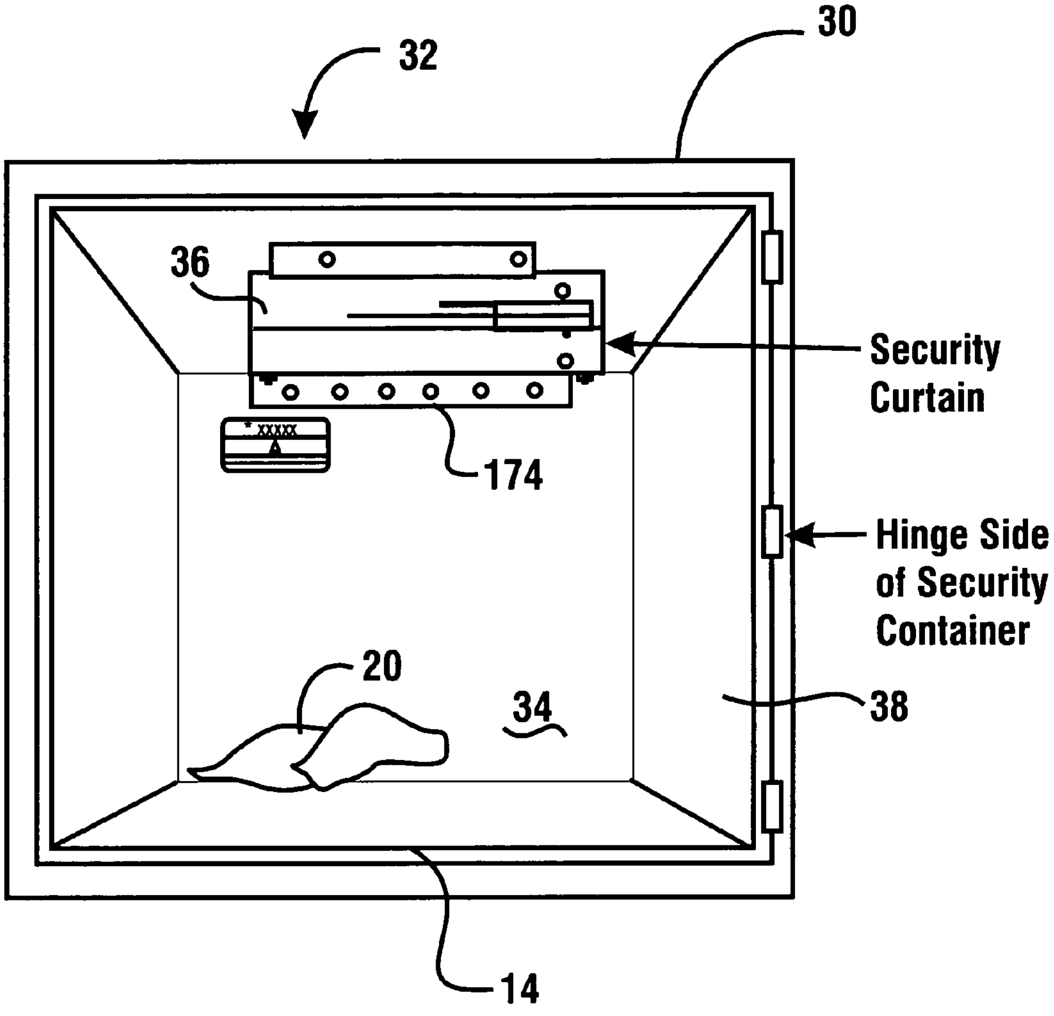
FIG. 22 is an isometric view of an exemplary secure chest including a security curtain and chest wall opening sensors.

In still other exemplary embodiments other features may be used to reduce the risk of attack on a bank protection device such as the depository structure shown. For example in some embodiments at least one chest wall opening sensor may be positioned adjacent to the chest opening 32 in the top wall 30 of the chest. FIG. 22 shows a chest 14 similar to that previously described. A plurality of chest wall opening sensors 174 are positioned adjacent to the chest opening. In the exemplary embodiment the chest wall opening sensors 174 include a plurality of non-contact sensors. The exemplary sensors include respective emitters and receivers that are operative to detect an object that is positioned in the chest opening. In the exemplary embodiment shown, the chest wall opening sensors are shown positioned below the security curtain. Alternatively in other embodiments such chest wall opening sensors may be positioned in other locations in or adjacent to the chest opening. Further such chest wall opening sensors may be positioned outside of, rather than within, the interior area 34 of the chest. In other embodiments other types of non-contact or contact sensors may be used for detecting an item in the opening. Of course it should be understood that this approach is exemplary, and in other embodiments other approaches may be used.

In the exemplary embodiment the chest wall opening sensors 174 are in operative connection through appropriate circuitry with the at least one circuit 150 of the exemplary embodiment, which operates to output one or more signals to close the security curtain, provide local and/or remote alarms or perform other functions. This is represented schematically in FIG. 23.

Further in this alternative embodiment the depository head includes at least one head door sensor schematically indicated 176. In this exemplary embodiment the at least one head door sensor is operative to detect the head door such as head door 22 or 110, in at least one position. It should be understood that in some embodiments the at least one head door sensor may include a sensor which is operative to detect the head door in the closed position, a sensor that is operative to sense the head door in an open position, or sensors that are operative to sense intermediate positions or a range of positions of the head door. Sensors of various types may be used for this purpose such as contact sensors, photo sensors, switches or other suitable devices. Such switches are in operative connection with the at least one circuit through appropriate interfaces or other circuitry as schematically represented in FIG. 23.

In further exemplary embodiments the depository head includes at least one head lock sensor schematically indicated 178. In the exemplary embodiment the at least one head lock sensor is in operative connection with the lock, such as key lock 24 that is operated to enable the door of the depository head to be opened. In the exemplary embodiment the at least one head lock sensor may be of a type that is operative to sense whether the lock is in an open or closed position. In still other embodiments the at least one head lock sensor may be operative to sense whether an appropriate key for unlocking the lock is positioned in or otherwise in operative connection with the lock. Various types of sensors may be operated in various embodiments and utilized as the at least one head lock sensor. This may include for example switches, photo sensors, capacitance sensors, RF sensors or other suitable sensors. As shown in FIG. 23, the at least one head lock sensor 176 is in operative connection through an appropriate interface or other device with the at least one circuit 150.

Figure 23:
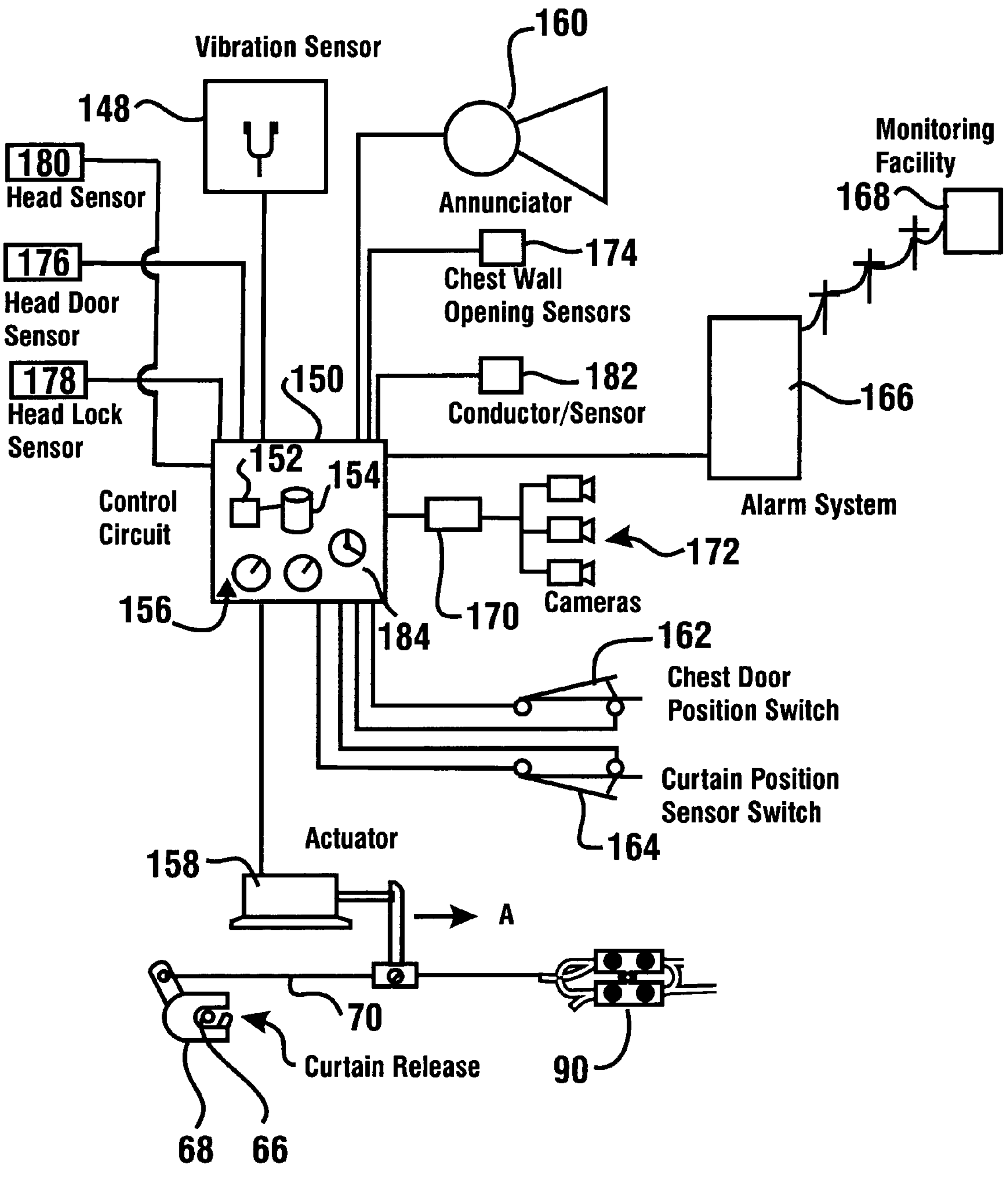
FIG. 23 is a schematic view of a system including circuitry for detecting vibration as well as other conditions and for providing alarm indications.

Also in an exemplary embodiment the depository includes at least one head sensor schematically indicated 180 in FIG. 23. In the exemplary embodiment the at least one head sensor 180 is operative to detect at least one portion of the depository head in a position. This may include for example sensing a position of a shaft, a blocking member or other depository head component, for purposes of detecting whether such a component has been subject to compromise. In some exemplary embodiments the at least one head sensor includes a sensor that is operative to determine if the depository has been subject to being cut with a saw or through another attack device, in a manner which causes the at least one head component being sensed to move from an initial position. This might include for example sensing that the shaft associated with a blocking member has been cut and removed or dropped into the chest.

In some exemplary embodiments the at least one head sensor comprises a capacitance type sensor. Such a capacitance sensor may be well suited in some embodiments to detecting the movement of one or more metal structures which are likely to be subject to attack by criminals. Of course in other embodiments other approaches may be used. As shown schematically in FIG. 3, the at least one head sensor 180 is in operative connection with the at least one circuit 150.

In still other embodiments at least one conductor may be positioned within the depository head. Such a conductor may include, for example, one or more electrical conductors through which electrical continuity can be detected. Alternatively or in other embodiments the one or more conductors may include fiber optic conductors such as fiber optic strands through which radiation signals can be detected and the continuity of which strands may be verified.

In some embodiments such conductors may be extended through components which may be subject to attack by criminals. This may include for example conductors extending through a shaft about which a blocking member rotates during operation of the depository. Alternatively such conducting members may be extended in other locations in which the continuity of the conductor is likely to be broken during an attack on the depository.

In exemplary embodiments the one or more conductors 182 as schematically indicated in FIG. 23, are operatively connected with the one or more control circuits 150 through appropriate interfaces. This may include for example electronic interfaces that are operative to monitor electrical continuity of the conductors. Alternatively in the case of fiber optic strands, appropriate sensors having emitters and receivers are used to monitor the continuity of the conductors and determine if one or more of the conductors is severed, such as might occur in connection with an attack. Of course it should be understood that these approaches are exemplary and in other embodiments other approaches may be used.

Further, in alternative exemplary embodiments the at least one circuit includes additional functions suitable for use in connection with the additional sensors and detectors of the type described. This may include for example a timer schematically indicated 184 in FIG. 23. In the exemplary embodiment the timer may operate to determine whether a particular condition has existed longer than a predetermined programmed limit. Such predetermined limits may correspond to data stored in at least one data store in operative connection with a processor which is a part of the circuitry. Alternatively or in addition the timer may be operative to determine time periods between events that are related. Thus for example, the timer may be used by the circuitry to determine if related events occur within permitted time periods or within particular sequences. Of course these approaches are exemplary and in other embodiments other approaches may be used.

For example in the exemplary embodiments such as those shown in FIG. 23, the at least one circuit may operate to determine the occurrence of suspect conditions correspond to a criminal attack on the depository and output one or more signals in response thereto. For example the control circuitry may operate to detect when an object is sensed through operation of the chest wall opening sensors. The detection of such an object will occur for example in situations where a deposit container 20 passes through the opening and into the interior area of the chest. However, the chest wall opening sensors may also be operative to detect devices used by burglars that may be extended into the opening.

In an exemplary embodiment the circuitry 150 operates to determine if the at least one head door sensor 176 indicates that the head door is in a position other than the closed position. As can be appreciated, in the exemplary embodiment when a deposit container is being placed in the depository head by an authorized user, the depository door will first be opened for purposes of inserting the deposit container. Once the deposit container has been placed in the depository head, the door will be closed. Once the door is closed, the depository head operates to cause the deposit container to pass through the opening in the top wall of the chest and into the interior area of the chest.

In the exemplary embodiment the at least one circuit 150 is operative to determine situations where at least one object is detected in the chest wall opening at a time when the depository door is not closed. The detection of such circumstances corresponds to an abnormal condition and may represent a criminal attempting to compromise the depository. In the exemplary embodiment the at least one control circuit determines the existence of this condition and operates to output at least one signal which causes the actuator 158 to cause the at least one plate member to move toward the plate shut condition. Alternatively or in addition the control circuitry may operate to generate at least one alarm signal and/or to provide an audible alarm through an audible annunciator to indicate the suspect condition. Of course these approaches are exemplary and in other embodiments other approaches may be used.

Also in the exemplary embodiment represented in FIG. 23, other conditions that may correspond to a criminal attack may be identified. This may include for example, the at least one circuit detecting with the head door sensor that the head door is not in the closed position and that a lock has not been moved to the unlocked position. This is determined through operation of the circuitry responsive to the at least one head door sensor 176 and the at least one head lock sensor 178. Detecting this condition may correspond to a criminal forcing the depository door open without the use of an authorized key or other device which authorized users use to open the depository door. In these circumstances the at least one circuit may operate to output at least one signal and cause the actuator to move the security curtain toward the shut position. Likewise in these circumstances alarm signals may be output and/or an annunciator may be used to sound an alarm.

Also as can be appreciated in some alternative embodiments the control circuitry may operate to detect sequences of events and identify normal sequences. A normal sequence of events may include for example, the head lock sensor detecting opening of the lock through use of an authorized key or other device. The depository door then opening so the user can input the deposit container would then normally be sensed. The depository door would thereafter be sensed as closed, when the passage of the deposited container into the chest is sensed with the chest wall opening sensors 174. In addition after sensing the closing of the head door the lock can be sensed as returned to the locked condition and/or the key sensed as disengaged. In some exemplary embodiments the at least one circuit may operate to monitor that events occur within appropriate sequences and within appropriate times. A failure of events to occur as expected in the sequence or events not occurring within expected time periods, may cause the at least one circuit to output signals that close the security curtain and/or take other steps.

In some further exemplary embodiments the at least one circuit may also operate to close the security curtain and/or provide alarm indications in response to the depository door remaining open beyond a predetermined time period. Thus for example the at least one circuit may sense through the at least one head door sensor that the depository door is open. The timer 184 of the circuit may operate to determine the time period that the door continuously remains open. Once the door has remained open beyond a predetermined time, the at least one circuit may operate to output one or more signals that close the security curtain in case the condition corresponds to a criminal attack. Likewise similar action may be taken responsive to the head lock sensor indicating that the head lock has been opened for a period of time that exceeds a predetermined limit. Of course these approaches are exemplary and in other embodiments other approaches may be used.

In still other exemplary embodiments the at least one circuit may operate to sense movement of at least a portion of the depository head from a position that may correspond to a criminal attack. For example, in some embodiments the head sensor 180 may operate to sense that the blocking member is positioned in its normal operating position. If criminals gain access to the depository head and cut the blocking member or a support structure associated with it, the head sensor will sense that the blocking member has been moved from the position. In response to the sensing of such movement by the head sensor, the at least one circuit may operate to output one or more signals that cause the security curtain to move toward the plate shut position and/or provide alarm indications. In the exemplary embodiment capacitance sensors are used for sensing movement or displacement of at least one portion of the head. Of course it should be understood that in other embodiments, other types of sensors and a sensing of other depository components may be used.

Also as can be appreciated the at least one circuit may also operate to close the security curtain and/or provide alarm indications in response to one or more conductors 182 being severed which is alternatively referred to herein as losing continuity. For example as previously discussed, such conductors may comprise electrical or fiber optic conductors that extend in areas that are likely to be severed in the event criminals attack the depository head. This may include, for example, fiber optic strands or other conductors extending through or on shafts about which blocking members rotate or in areas or on components that are likely to be cut or displaced during the course of a criminal attack. In the exemplary embodiment if the continuity of one or more of the conductors is broken, the at least one circuit 150 operates to output signals that cause the at least one plate member to move through operation of the actuator toward the shut condition. Alternatively or in addition, alarm signals may be sent to a local or remote notification system and/or an audible alarm may be sounded.

It should be understood that these approaches are exemplary. Such approaches may be used separately or in combination in some embodiments to reduce the risk of theft from a bank protection device such as a depository. Further it should be understood that in some embodiments not all of the steps described may be taken. For example in some circumstances an indication may be given remotely in response to detecting a particular condition, but the security curtain may not be closed. Alternatively in some exemplary embodiments the control circuitry may operate to cause images to the captured by cameras and retained in memory associated with a processor so as to document any activity, but not cause an immediate alarm to be given. This might include for example situations where the depository door or the lock on the depository head is determined to be open beyond a particular time period but are not open for so long as to indicate a high probability of a criminal attack. This may be done utilizing features described in U.S. Pat. No. 7,533,805 the disclosure of which is incorporated herein by reference in its entirety. Of course these approaches are exemplary and in other embodiments other approaches may be used.

In still other exemplary embodiments provision may be made for dealing with false alarm conditions that might occur and which cause the security curtain to close. This might occur for example in situations where vibration of a suspect type is detected and a security curtain is closed. However, analysis of the video images and/or inspection by law enforcement determines that no attack has occurred. In such circumstances alternative embodiments may operate to cause the security curtain to be retracted so that the depository can be placed back into service. This may be accomplished by providing one or more actuators that are operatively connected to the one or more catch structures on the movable plate members. This may be done for example by having electrically actuatable plungers that can push or retract the pins out of the apertures of the frame in which they have been engaged. A motor or similar electronically controllable movement device may be thereafter actuatable to cause the movable plate members 52, 54 and 56 to move so as to reopen the opening in the top of the chest. This might be done for example using a motor drive and cable structure, gearing or other suitable mechanical members.

Further in some exemplary embodiments encrypted communications may be provided between a remote location such as the remote monitoring center 168 and the circuitry 150 to assure that the security curtain is only opened in response to authorized signals. Of course it should be understood that these approaches are exemplary and in other embodiments other approaches may be used.

As can be appreciated the structures of some exemplary embodiments are suitable to be installed on existing depositories. The methods for retrofitting such depositories may include opening the chest and installing the security curtain within the chest. This is done in the manner previously described so that when the movable plate members move to the plate shut position, the opening through the top wall of the chest is blocked. Such installation may be accomplished in some embodiments by securing the ears 46 of frame 44 to the inside of the top wall of the chest through suitable fasteners. Of course this approach is exemplary, and in other embodiments other approaches may be used.

In retrofitting a depository, a cable or other portion of an actuator may be attached to a shaft or other component of the depository head. The cable may then be extended through an appropriate guide or other structure so as to extend to a suitable location in which it can be connected to a releasible connector such as connector 90. Connector 90 is then used to connect the one or more cables in connection with the depository head to a further cable or other member that extends to the latch 68. As can be appreciated depending on the nature of the depository head, cables may be operatively connected to shaft structures, housing structures or other appropriate structures that if relatively moved are indicative of an attack on the depository head.

Further methods of retrofitting a depository may include installing one or more head door sensors 176 in operative connection with the depository door. An appropriate head lock sensor 178 may be installed in connection with the lock on the depository so as to sense the condition thereof and/or the operative connection of a key or other device therewith. Further some embodiments may include installing one or more chest wall sensors 174 adjacent to the chest wall opening. This may include for example installing a sensor array in supported connection with the security curtain or in connection with other structures adjacent to the chest wall opening. Further methods include installing one or more head sensors 180 so as to sense the at least one portion of a depository head. This may include, for example, installing one or more capacitance sensors in appropriate positions so as to sense structures of the head portion. Likewise methods of retrofitting a depository head may include extending conductors such as fiber optic strands or electrical conductors in areas in which they are likely to be severed in the event of a criminal attack.

Further methods of retrofitting a depository may include attaching one or more vibration sensors 148 to the depository head. The vibration sensors are operatively connected to the control circuitry 150. The control circuitry 150 may in some embodiments be installed within the interior of the secure chest so as to minimize the risk of tampering. A door sensor 162 may be installed to detect the position of the chest door. Similarly the security curtain will be installed within the chest in a manner like that previously discussed. The curtain position sensor switch 164 may also be installed. Installation and connections are also made to the annunciator 160, the alarm system 166 and to an actuator or other mechanism 158. Other systems such as the video recorder system 170 may also be connected. All the appropriate devices are connected to the circuitry 150 so as to enable the operation of the capabilities of the particular system.

It should be understood that the devices, systems and methods described are exemplary and other embodiments may include other or different types of devices, sensors, actuators, security devices or other features.

Thus the new systems and methods described herein achieve at least some of the above stated objectives, eliminate difficulties encountered in the use of prior devices and systems, solve problems and attain the desirable results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. Apparatus comprising:

a depository head, wherein the depository head is configured to accept deposit containers housing financial instrument sheets therein;

a secure chest, wherein the chest is positioned below the depository head, wherein the chest bounds an interior area, wherein the interior area is configured to hold a plurality of deposit containers, wherein the chest includes a top wall, wherein the top wall includes a chest wall opening, wherein the chest wall opening is configured to enable deposit containers to pass therethrough, wherein the depository head is in operative communication with the interior area through the chest wall opening;

at least one chest wall opening sensor, wherein the at least one chest wall opening sensor is operative to sense at least one of deposit containers and other objects in the chest wall opening;

wherein the depository head includes:

an externally accessible head opening, wherein the head opening is configured to accept deposit containers therethrough;

a movably mounted head door, wherein the head door is movable between a head door open position wherein deposit containers are passable through the head opening, and a head door closed position wherein the head door closes the head door opening;

at least one movable member, wherein the at least one movable member is in operative connection with the head door, wherein in the head door open position the at least one movable member is in a blocking position, wherein the at least one movable member in the blocking position blocks communication between the head opening and the chest wall opening, wherein in the head door closed position, the at least one movable member is in a passing position, wherein the at least one movable member in the passing position enables a deposit container within the depository head to move to the chest wall opening; and at least one head door sensor, wherein the at least one head door sensor is operative to sense the head door in at least one head door position;

at least one plate member, wherein the at least one plate member is movably mounted in operatively supported connection with the chest;

wherein the at least one plate member is movable between a plate shut position and a plate open position, wherein in the plate shut position the at least one plate member is operative to block at least a portion of the chest wall opening, wherein in the plate open position the at least one plate member is positioned to enable access through the chest wall opening;

an actuator, wherein the actuator is in operative connection with the at least one plate member, wherein the actuator is operative to cause the at least one plate member in the plate open position to move toward the plate shut position;

at least one circuit, wherein the at least one circuit is in operative connection with the at least one head door sensor, the at least one chest wall opening sensor, and the actuator, wherein the at least one circuit is operative to output at least one signal and to cause the actuator to cause the at least one plate member to move toward the plate shut position, responsive at least in part to an object being sensed in the chest wall opening by the at least one chest wall opening sensor when the head door is sensed as being in other than the head door closed position by the at least one head door sensor.

2. The apparatus according to claim 1, wherein the depository head further includes a head lock, wherein the head lock is in operative connection with the head door, wherein the head lock is changeable responsive to an authorized key from a head lock closed condition to a head lock open condition, wherein in the head lock closed condition the head door is prevented from moving from the head door closed position to the head door open position, wherein in the head lock open condition the head door is movable between the head door closed position and the head door open position;

a head lock sensor, wherein the head lock sensor is in operative connection with the head lock, wherein the head lock sensor is in operative connection with the at least one circuit; and wherein the at least one circuit is operative responsive to the head door being sensed in the head door open position through operation of the at least one head door sensor when the head lock is sensed in the head lock closed condition through operation of the head lock sensor, to output the at least one signal and cause the actuator to cause the at least one plate member to move toward the plate shut position.

3. The apparatus according to claim 2 and further comprising:

at least one conductor extending through at least a portion of the depository head, wherein the at least one conductor is in operative connection with the at least one circuit;

wherein the at least one circuit is operative responsive at least in part to breaking of continuity of the at least one conductor, to output the at least one signal and cause the actuator to cause the at least one plate member to move toward the plate shut position.

4. The apparatus according to claim 3 wherein the at least one conductor comprises at least one fiberoptic strand.

5. The apparatus according to claim 3 wherein the at least one movable member is rotatably movable in operative connection with a shaft, and wherein the at least one conductor is in operatively supported connection with the shaft.

6. The apparatus according to claim 3 wherein the at least one circuit includes a timer, wherein responsive to the head door being in the head door open position for at least a predetermined time based on timing by the timer, the at least one circuit is operative to output the at least one signal and cause the actuator to cause the at least one plate member to move toward the plate shut position.

7. The apparatus according to claim 6 and further comprising:

at least one head sensor, wherein the at least one head sensor is operative to sense at least a portion of the depository head in a position, wherein the at least one head sensor is in operative connection with the at least one circuit;

wherein the at least one circuit is operative responsive to the at least a portion of the depository head not being in the position to output the at least one signal and to cause the actuator to cause the at least one plate member to move toward the plate shut position.

8. The apparatus according to claim 7 wherein the at least one head sensor is operative to sense the at least one movable member in the position.

9. The apparatus according to claim 8 wherein the depository head is configured such that the at least one movable member moving from the position corresponds to at least a portion of the depository head being cut.

10. The apparatus according to claim 9 wherein the at least one head sensor comprises a capacitance sensor.

11. The apparatus according to claim 7 and further comprising:

a vibration sensor, wherein the vibration sensor is in operative connection with the depository head, wherein the vibration sensor is in operative connection with the at least one circuit, wherein the at least one circuit is operative responsive at least in part to vibration sensed through operation of the vibration sensor to output the at least one signal and to cause the actuator to cause the at least one plate member to move toward the plate shut position.

12. The apparatus according to claim 11, wherein the at least one circuit is operative to cause the actuator to output the at least one signal and to cause the at least one plate member to move toward the plate shut position, responsive at least in part to sensed vibration corresponding to sawing action.

13. The apparatus according to claim 11 and further comprising:

an annunciator, wherein the annunciator is operative to output an audible signal, wherein the annunciator is in operative connection with the at least one circuit, wherein the at least one circuit is operative to cause the annunciator to operate responsive at least in part to a condition of at least one of the chest wall opening sensor, the at least one head door sensor, the head lock sensor, the at least one conductor, the timer, the at least one head sensor, and the vibration sensor.

14. The apparatus according to claim 13 wherein the at least one circuit is operative to cause the annunciator to operate responsive to the at least one signal.

15. The apparatus according to claim 11 wherein the at least one signal includes an alarm signal, wherein the at least one circuit is operative to output the alarm signal responsive to at least one of the chest wall opening sensor, the at least one head door sensor, the head lock sensor, the at least one conductor, the timer, the at least one head sensor, and the vibration sensor.

16. The apparatus according to claim 11 and further comprising:

at least one catch, wherein the at least one catch is operative to cause the at least one plate member to be held in the plate shut position;

at least one release member in operative connection with the at least one catch, wherein the at least one release member is operative to release the at least one catch, wherein upon catch release the at least one plate member is movable from the plate shut position to the plate open position, wherein the at least one release member is manually accessible within the interior area of the chest.

17. The apparatus according to claim 16, wherein the chest further includes:

a deposit container removal opening, wherein the deposit container removal opening is configured for removal of deposit containers from the interior area therethrough;

a chest door, wherein the chest door is movably mounted in operatively supported connection with the chest, wherein the chest door is movable between a position opening the deposit container removal opening and a position closing the deposit container removal opening;

a chest lock, wherein the chest lock is in operative connection with the chest door, wherein the chest lock is selectively operative to hold the chest door in the position closing the deposit container removal opening;

wherein in the position opening the deposit container removal opening, the at least one release member is manually accessible through the deposit container removal opening.

18. The apparatus according to claim 17 and further comprising:

a chest door switch, wherein the chest door switch is in operative connection with the chest door and the at least one circuit;

wherein the at least one circuit is operative to cause the actuator not to operate to cause the at least one plate member to move toward the plate shut position, responsive to the chest door switch sensing that the chest door is not in the position closing the deposit container removal opening.

19. The apparatus according to claim 18 wherein the at least one plate member includes a plurality of operatively interconnected plates, and further comprising at least one spring, wherein the at least one spring is in operative connection with at least one of the plates, and wherein the at least one spring biases at least one of the plates toward the plate shut position.

20. The apparatus according to claim 1 and further comprising:

at least one head sensor, wherein the at least one head sensor is operative to sense at least a portion of the depository head in at least one position, wherein the at least one head sensor is in operative connection with the at least one circuit;

wherein the at least one circuit is operative responsive to the at least one head sensor to output the at least one signal and to cause the actuator to cause the at least one plate member to move toward the plate shut position.

21. The apparatus according to claim 1 and further comprising:

at least one conductor extending in the depository head, wherein the at least one conductor is in operative connection with the at least one circuit;

wherein the at least one circuit is operative responsive to breaking of continuity of the at least one conductor to output the at least one signal and to cause the actuator to cause the at least one plate member to move toward the plate shut position.

22. The apparatus according to claim 1 wherein the at least one circuit includes a timer, wherein the at least one circuit is operative responsive to the timer and the at least one head door sensor, to determine that the head door has been open longer than a predetermined time, wherein the at least one circuit is operative responsive to the determination to output the at least one signal and to cause the actuator to cause the at least one plate member to move toward the plate shut position.

23. The apparatus according to claim 1 and further comprising:

a vibration sensor, wherein the vibration sensor is in operative connection with the at least one circuit;

wherein the at least one circuit is operative responsive to vibration sensed through operation of the vibration sensor to output the at least one signal and to cause the actuator to cause the at least one plate member to move toward the plate shut position.

24. The apparatus according to claim 1 wherein the at least one signal includes an alarm signal, wherein the at least one circuit is operative to output the alarm signal responsive at least in part to both the at least one chest wall opening sensor sensing an object in the chest wall opening, and the at least one head door sensor sensing the head door in other than the had door closed position.

25. Apparatus comprising:

a depository head, wherein the depository head is configured to accept deposit containers housing financial instrument sheets therein;

a secure chest, wherein the chest is positioned below the depository head, wherein the chest-bounds an interior area, wherein the interior area is configured to hold a plurality of deposit containers;

wherein the chest includes a top wall, wherein the top wall includes a chest wall opening, wherein the chest wall opening is configured to enable deposit containers to pass therethrough, wherein the depository head is in operative communication with the interior area through the chest wall opening;

wherein the depository head includes:

an externally accessible head opening, wherein the head opening is configured to accept deposit containers therethrough;

a movably mounted head door, wherein the head door is movable between a head door open position wherein deposit containers are passable through the head opening, and a head door closed position wherein the head door closes the head door opening;

at least one head door sensor, wherein the at least one head door sensor is operative to sense the head door in at least one position; and at least one movable member, wherein the at least one movable member is in operative connection with the head door, wherein in the head door open position the at least one movable member is in a blocking position, wherein the at least one movable member in the blocking position blocks communication between the head opening and the chest wall opening, wherein in the head door closed position the at least one movable member is in a passing position, wherein the at least one movable member in the passing position enables a deposit container within the depository head to move to the chest wall opening;

at least one movable plate member, wherein the at least one movable plate member is movably mounted in operatively supported connection with the chest, wherein the at least one movable plate member is movable between a plate shut position and a plate open position, wherein in the plate shut position the at least one movable plate member is operative to block at least a portion of the chest wall opening, wherein in the plate open position the at least one movable plate member is positioned to enable access through the chest wall opening;

an actuator, wherein the actuator is in operative connection with the at least one movable plate member, wherein the actuator is operative to cause the at least one movable plate member in the plate open position to move toward the plate shut position;

at least one circuit, wherein the at least one circuit is in operative connection with the at least one head door sensor and the actuator, wherein the at least one circuit includes a timer, and wherein the at least one circuit is operative responsive at least in part to the at least one head door sensor sensing the head door being in other than the head door closed position for more than a predetermined time, to output at least one signal and to cause the actuator to cause the at least one movable plate member to move toward the plate shut position.

26. The apparatus according to claim 25 and further comprising:

at least one chest wall opening sensor, wherein the at least one chest wall opening sensor is operative to sense at least one of deposit containers and other objects in the chest wall opening;

wherein the at least one circuit is in operative connection with the at least one chest wall opening sensor, wherein the at least one circuit is operative to output the at least one signal and to cause the actuator to cause the at least one movable plate member to move toward the plate shut position, responsive at least in part to an object being sensed in the chest wall opening by the at least one chest wall opening sensor when the head door is sensed as being in other than the head door closed position by the at least one head door sensor.

27. Apparatus comprising:

a depository head, wherein the depository head is configured to accept deposit containers housing financial instrument sheets therein;

a secure chest, wherein the chest is positioned below the depository head, wherein the chest bounds an interior area, wherein the interior area is configured to hold a plurality of deposit containers;

wherein the chest includes a top wall, wherein the top wall includes a chest wall opening, wherein the chest wall opening is configured to enable deposit containers to pass therethrough, wherein the depository head is in operative communication with the interior area through the chest wall opening;

wherein the depository head includes:

an externally accessible head opening, wherein the head opening is configured to accept deposit containers therethrough;

a movably mounted head door, wherein the head door is movable between a head door open position wherein deposit containers are passable through the head opening, and
a head door closed position wherein the head door closes the head door opening; and
at least one movable member,
wherein the at least one movable member is in operative connection with the head door,
wherein in the head door open position the at least one movable member is in a blocking position,
wherein the at least one movable member in the blocking position blocks communication between the head opening and the chest wall opening,
wherein in the head door closing position the at least one movable member is in a passing position,
wherein the at least one movable member in the passing position enables a deposit container within the depository head to move to the chest wall opening;
at least one movable plate member,
wherein the at least one movable plate member is movably mounted in operatively supported connection with the chest;
wherein the at least one movable plate member is movable between a plate shut position and a plate open position,
wherein in the plate shut position the at least one movable plate member is operative to block at least a portion of the chest wall opening,
wherein in the plate open position the at least one movable plate member is positioned to enable access through the chest wall opening;
at least one conductor,
wherein the at least one conductor extends in at least a portion of the depository head;
an actuator,
wherein the actuator is in operative connection with the at least one movable plate member,
wherein the actuator is operative to cause the at least one movable plate member in the plate open position to move toward the plate shut position;
at least one circuit,
wherein the at least one circuit is in operative connection with the at least one conductor and the actuator,
wherein the at least one circuit is operative responsive at least in part to breaking of the at least one conductor, to output at least one signal and to cause the actuator to cause the at least one movable plate member to move from the plate open position toward the plate shut position.

28. The apparatus according to claim 27 and further comprising:
at least one head door sensor,
wherein the at least one head door sensor is operative to sense the head door in at least one position,
wherein the at least one head door sensor is in operative connection with the at least one circuit;
at least one chest wall opening sensor,
wherein the at least one chest wall opening sensor is operative to sense at least one of deposit containers and other objects in the chest wall opening,
wherein the at least one chest wall opening sensor is in operative connection with the at least one circuit;
wherein the at least one circuit is operative to output the at least one signal and to cause the actuator to cause the at least one movable plate member to move toward the plate shut position, responsive at least in part to an object being sensed in the chest wall opening by the at least one chest wall opening sensor when the head door is sensed as being in other than the head door closed position by the at least one head door sensor.

29. Apparatus comprising:
a depository head,
wherein the depository head is configured to accept deposit containers housing financial instrument sheets therein;
a secure chest,
wherein the chest is positioned below the depository head,
wherein the chest bounds an interior area, wherein the interior area is configured to hold a plurality of deposit containers;
wherein the chest includes a top wall,
wherein the top wall includes a chest wall opening,
wherein the chest wall opening is configured to enable deposit containers to pass therethrough,
wherein the depository head is in operative communication with the interior area through the chest wall opening;
wherein the depository head includes:
an externally accessible head opening,
wherein the head opening is configured to accept deposit containers therethrough;
a movably mounted head door,
wherein the head door is movable between
a head door open position wherein deposit containers are passable through the head opening, and
a head door closed position wherein the head door closes the head door opening; and
at least one movable member,
wherein the at least one movable member is in operative connection with the head door,
wherein in the head door open position the at least one movable member is in a blocking position,
wherein the at least one movable member in the blocking position blocks communication between the head opening and the chest wall opening,
wherein in the head door closed position the at least one movable member is in a passing position,
wherein the at least one movable member in the passing position enables a deposit container within the depository head to move to the chest wall opening;
at least one movable plate member,
wherein the at least one movable plate member is movably mounted in operatively supported connection with the chest,
wherein the at least one movable plate member is movable within the chest between a plate shut position and a plate open position,
wherein in the plate shut position the at least one movable plate member is operative to block at least a portion of the chest wall opening,
wherein in the plate open position the at least one movable plate member is positioned to enable access through the chest wall opening;
at least one head sensor,
wherein the at least one head sensor is operative to sense movement of at least a portion of the depository head;
at least one actuator,
wherein the at least one actuator is in operative connection with the at least one movable plate member, wherein the at least one actuator is operative to cause the at least one movable plate member in the plate open position to move toward the plate shut position;

at least one circuit, wherein the at least one circuit is in operative connection with the at least one head sensor and the at least one actuator, wherein the at least one circuit is operative to output at least one signal and to cause the actuator to cause the at least one movable plate member to move toward the plate shut position, responsive at least in part to the at least one head sensor sensing movement of the at least a portion of the depository head.

30. The apparatus according to claim 29 and further comprising:

at least one head door sensor, wherein the at least one head door sensor is operative to sense the head door in at least one position, wherein the at least one head door sensor is in operative connection with the at least one circuit;

at least one chest wall opening sensor, wherein the at least one chest wall opening sensor is operative to sense at least one of deposit containers and other objects in the chest wall opening, wherein the at least one chest wall opening sensor is in operative connection with the at least one circuit;

wherein the at least one circuit is operative to output the at least one signal and to cause the actuator to cause the at least one movable plate member to move toward the plate shut position, responsive at least in part to an object being sensed in the chest wall opening by the at least one chest wall opening sensor when the head door is sensed as being in other than the head door closed position by the at least one head door sensor.

31. Apparatus comprising:

a depository head, wherein the depository head is configured to accept deposit containers housing financial instrument sheets therein;

a secure chest, wherein the chest is positioned below the depository head, wherein the chest bounds an interior area, wherein the interior area is configured to hold a plurality of deposit containers;

wherein the chest includes a top wall, wherein the top wall includes a chest wall opening, wherein the chest wall opening is configured to enable deposit containers to pass therethrough, wherein the depository head is in operative communication with the interior area through the chest wall opening;

wherein the depository head includes:

an externally accessible head opening, wherein the head opening is configured to accept deposit containers therethrough;

a movably mounted head door, wherein the head door is movable between a head door open position wherein deposit containers are passable through the head opening, and a head door closed position wherein the head door closes the head door opening;

at least one head door sensor, wherein the at least one head door sensor is operative to sense the head door in at least one position;

at least one movable member, wherein the at least one movable member is in operative connection with the head door, wherein in the head door open position the at least one movable member is in a blocking position, wherein the at least one movable member in the blocking position blocks communication between the head opening and the chest wall opening, wherein in the head door closing position the at least one movable member is in a passing position, wherein the at least one movable member in the passing position enables a deposit container within the depository head to move to the chest wall opening;

a head lock, wherein the head lock is in operative connection with the head door;

wherein the head lock is changeable from a head lock closed condition to a head lock open condition, wherein in the head lock closed condition the head door is restricted through operation of the head lock from moving from the head door closed position; and a head lock sensor, wherein the head lock sensor is in operative connection with the head lock, wherein the head lock sensor is operative to sense whether the head lock is in at least one of the head lock open condition and head lock closed condition;

at least one movable plate member, wherein the at least one movable plate member is movably mounted in operatively supported connection with the chest;

wherein the at least one movable plate member is movable between a plate shut position and a plate open position, wherein in the plate shut position the at least one movable plate member is operative to block at least a portion of the chest wall opening, wherein in the plate open position the at least one movable plate member is positioned to enable access through the chest wall opening;

an actuator, wherein the actuator is in operative connection with the at least one movable plate member, wherein the actuator is operative to cause the at least on movable plate member in the plate open position to move toward the plate shut position;

at least one circuit, wherein the at least one circuit is in operative connection with the at least one head door sensor, the head lock sensor, and the actuator, wherein the at least one circuit is operative responsive at least in part to the at least one head door sensor operating to sense the head door being in other than the head door closed position when the head lock is sensed in other than the head lock open condition through operation of the head lock sensor, to output at least one signal and to cause the actuator to cause the at least one movable plate member to move toward the plate shut position.

32. The apparatus according to claim 31 and further comprising:

at least one chest wall opening sensor, wherein the at least one chest wall opening sensor is operative to sense at least one of deposit containers and other objects in the chest wall opening;

wherein the at least one circuit is in operative connection with the at least one chest wall opening sensor, wherein the at least one circuit is operative to output the at least one signal and cause the actuator to cause the at least one movable plate member to move toward the plate shut position, responsive at least in part to an object being sensed in the chest wall opening by the at least one chest wall opening sensor when the head door is sensed as being in other than the head door closed position by the at least one head door sensor.

* * * * *